(12) United States Patent
de Dinechin et al.

(10) Patent No.: US 7,213,125 B2
(45) Date of Patent: May 1, 2007

(54) METHOD FOR PATCHING VIRTUALLY ALIASED PAGES BY A VIRTUAL-MACHINE MONITOR

(75) Inventors: Christophe de Dinechin, Roquebrune sur Argens (FR); Todd Kjos, Los Altos, CA (US); Jonathan Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 10/909,969

(22) Filed: Jul. 31, 2004

(65) Prior Publication Data

US 2006/0026385 A1  Feb. 2, 2006

(51) Int. Cl.
*G06F 12/00* (2006.01)
(52) U.S. Cl. .............. 711/203; 711/147; 711/200; 711/202; 718/1; 718/100; 718/102; 718/104
(58) Field of Classification Search ........ 711/202, 711/203, 147, 200; 718/1, 104, 100, 102
See application file for complete search history.

(56) References Cited

U.S. PATENT DOCUMENTS

| 5,621,912 A * | 4/1997 | Borruso et al. ............ 718/1 |
| 5,875,487 A * | 2/1999 | Schwartz et al. .......... 711/202 |
| 2002/0133810 A1* | 9/2002 | Giles et al. .............. 717/138 |
| 2005/0039180 A1* | 2/2005 | Fultheim et al. .......... 718/1 |
| 2005/0188374 A1* | 8/2005 | Magenheimer ........... 718/100 |

* cited by examiner

*Primary Examiner*—Stephen C. Elmore
*Assistant Examiner*—Daniel Kim

(57) ABSTRACT

Various embodiments of the present invention are directed to methods by which a virtual-machine monitor can introduce branch instructions, in order to emulate privileged and other instructions on behalf of a guest operating system, into guest-operating-system code residing on virtually aliased virtual-memory pages. In a described embodiment of the present invention, the virtual-machine monitor physically aliases each virtual alias for a particular physical memory page by allocating a physical page for the virtual alias, copying the original contents of the physical memory page to the allocated physical page, or physical alias page, and subsequently patching each physical alias page appropriate to the physical address of the physical alias page.

8 Claims, 27 Drawing Sheets

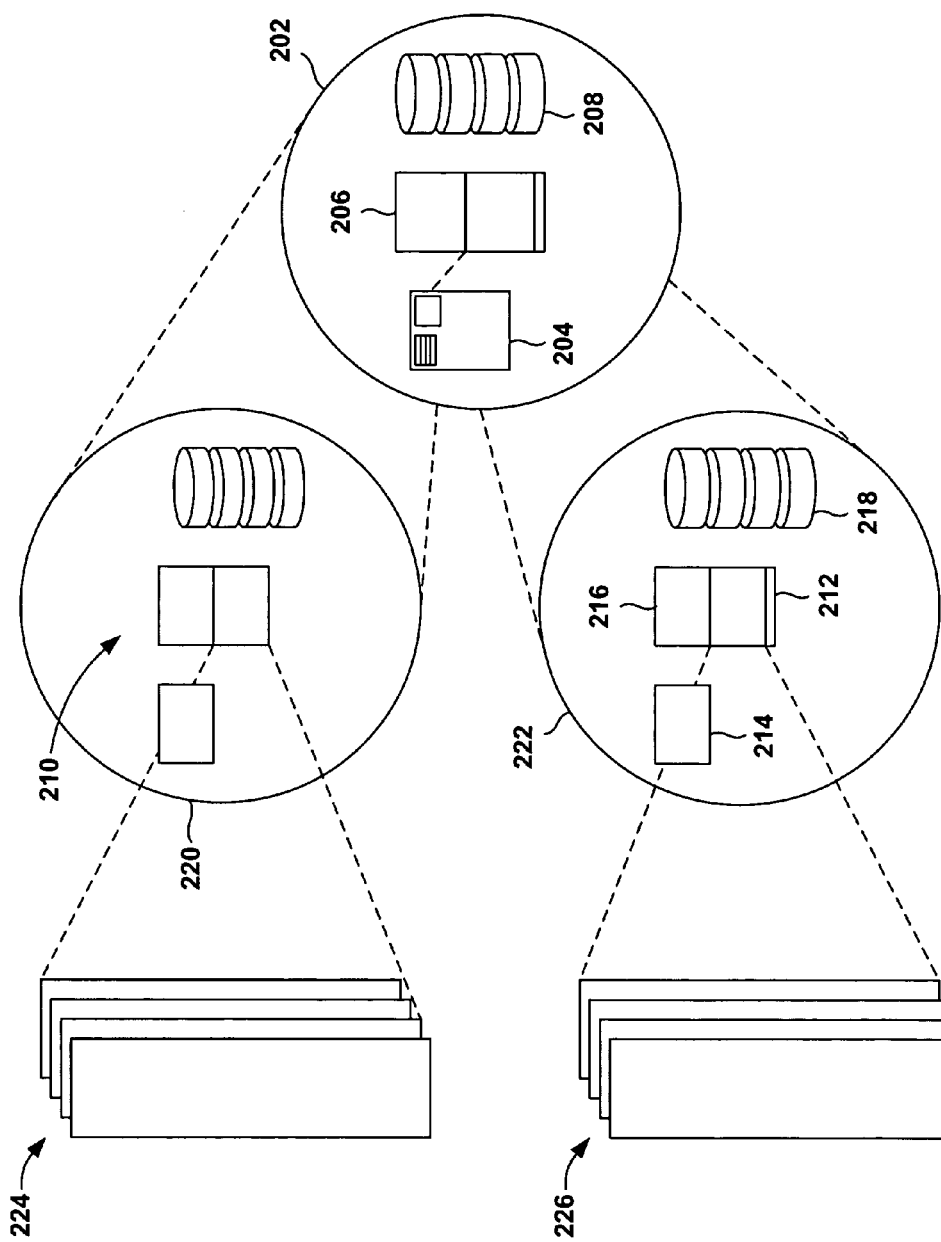

Application Register Set
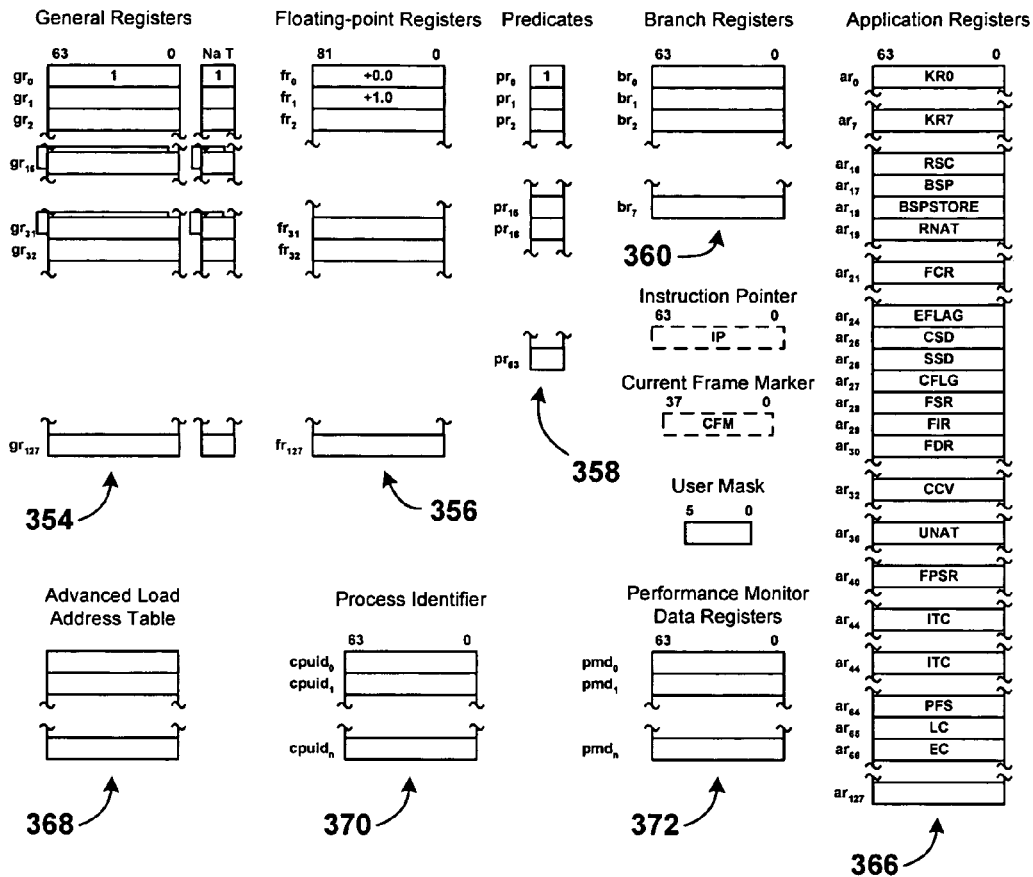
System Register Set
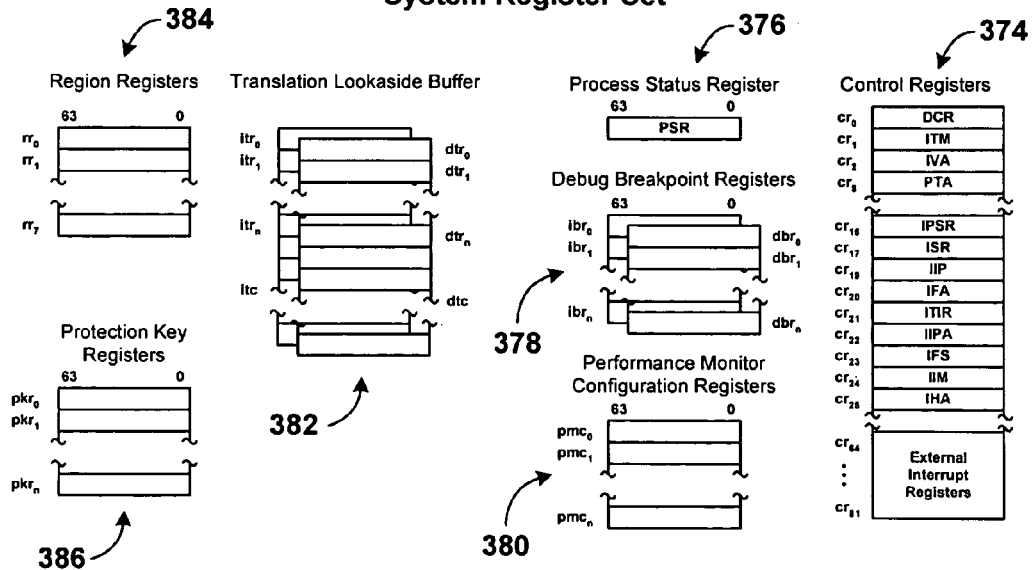
Figure 3B

| TLB.ar | TLB.pl | PRIVILEGE LEVEL | | | | DESCRIPTION |
| --- | --- | --- | --- | --- | --- | --- |
| | | 3 | 2 | 1 | 0 | |
| 0 | 3 | R | R | R | R | READ ONLY —710 |
| | 2 | | R | R | R | |
| | 1 | | | R | R | |
| | 0 | | | | R | |
| 1 | 3 | RX | RX | RX | RX | READ, EXECUTE |
| | 2 | | RX | RX | RX | |
| | 1 | | | RX | RX | |
| | 0 | | | | RX | |
| 2 | 3 | RW | RW | RW | RW | READ, WRITE |
| | 2 | | RW | RW | RW | |
| | 1 | | | RW | RW | |
| | 0 | | | | RW | |
| 3 | 3 | RWX | RWX | RWX | RWX | READ, WRITE, EXECUTE |
| | 2 | | RWX | RWX | RWX | |
| | 1 | | | RWX | RWX | |
| | 0 | | | | RWX | |
| 4 | 3 | R | RW | RW | RW | READ ONLY/ READ, WRITE |
| | 2 | | R | RW | RW | |
| | 1 | | | R | RW | |
| | 0 | | | | RW | |
| 5 | 3 | RX | RX | RX | RWX | READ, EXECUTE/ READ, WRITE, EXEC |
| | 2 | | RX | RX | RWX | |
| | 1 | | | RX | RWX | |
| | 0 | | | | RWX | |
| 6 | 3 | RWX | RW | RW | RW | READ, WRITE, EXECUTE/ READ, WRITE |
| | 2 | | RWX | RW | RW | |
| | 1 | | | RWX | RW | |
| | 0 | | | | RW | |
| 7 | 3 | X | X | X | RX | EXEC, PROMOTE/ READ, EXECUTE |
| | 2 | XP2 | X | X | RX | |
| | 1 | XP1 | XP1 | X | RX | |
| | 0 | XP0 | XP0 | XP0 | RX | |

Figure 7

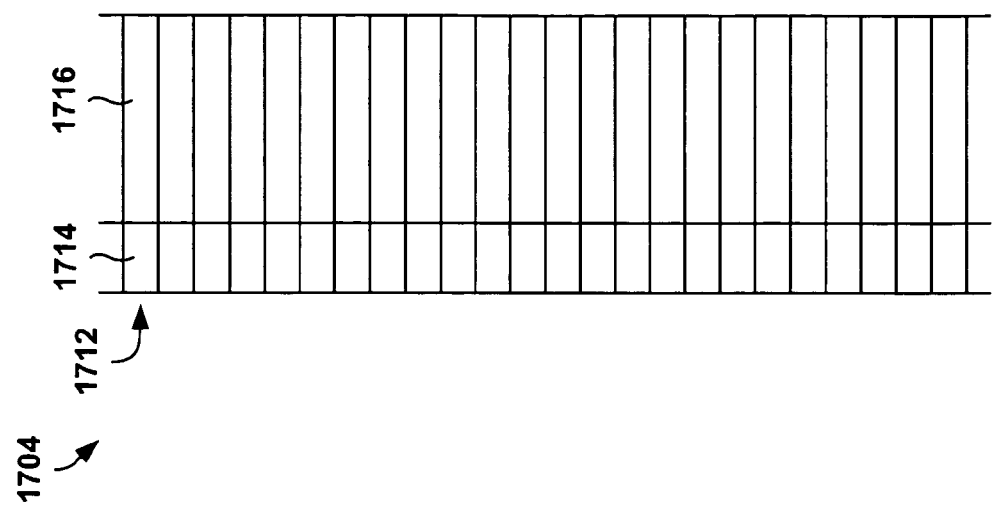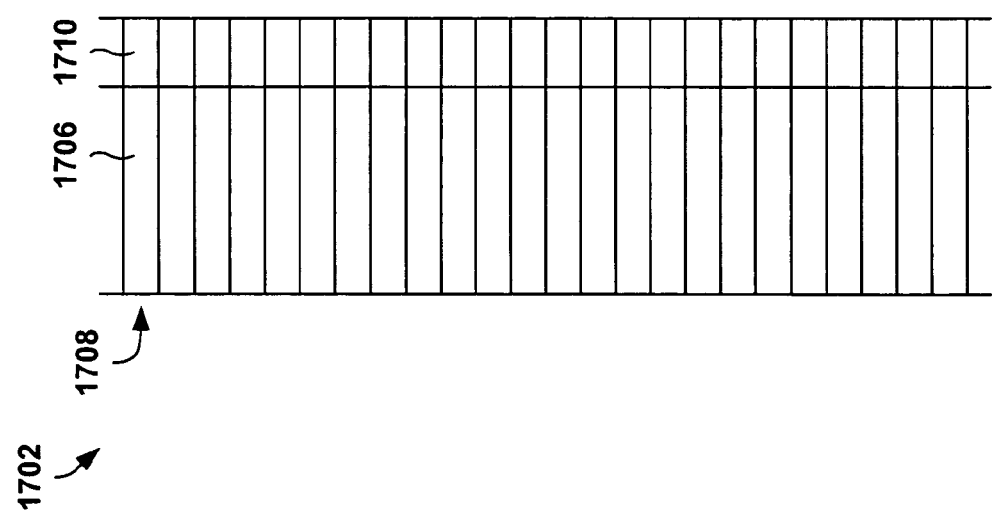
Figure 17

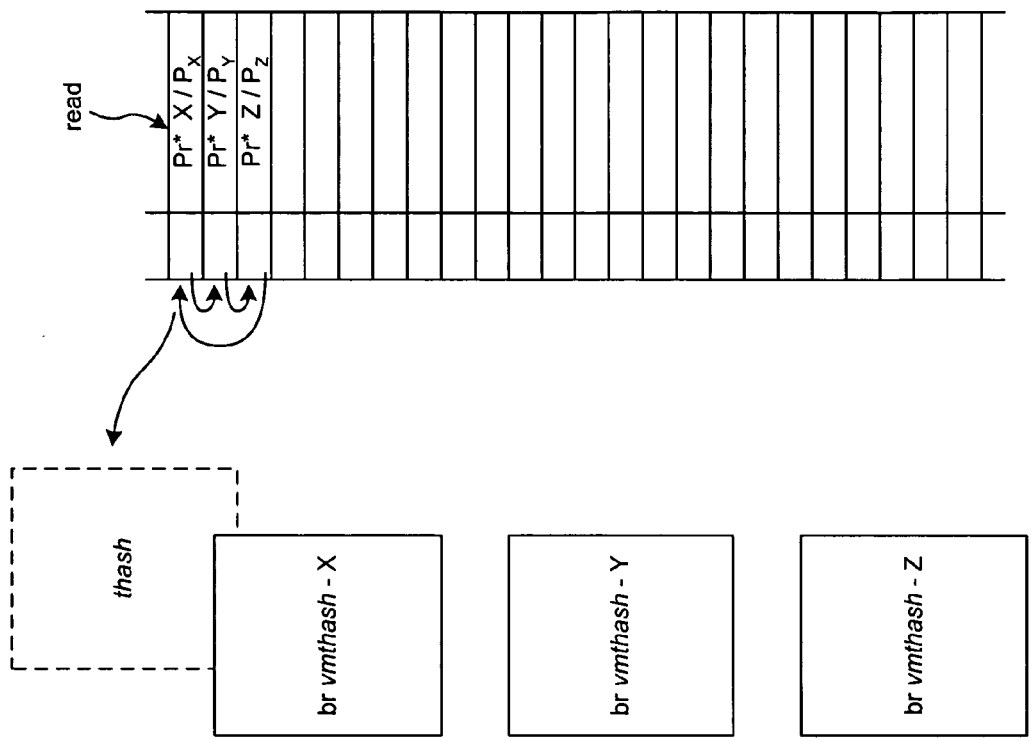
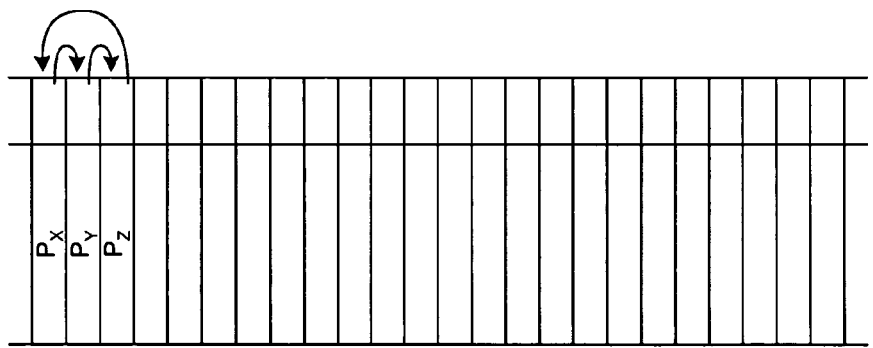
Figure 22

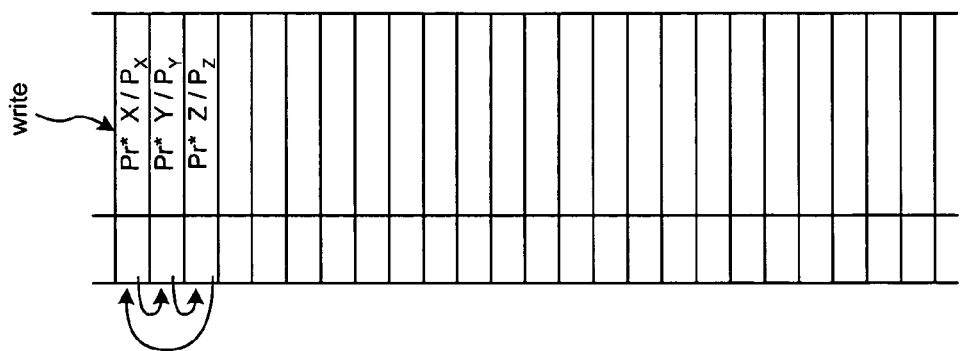
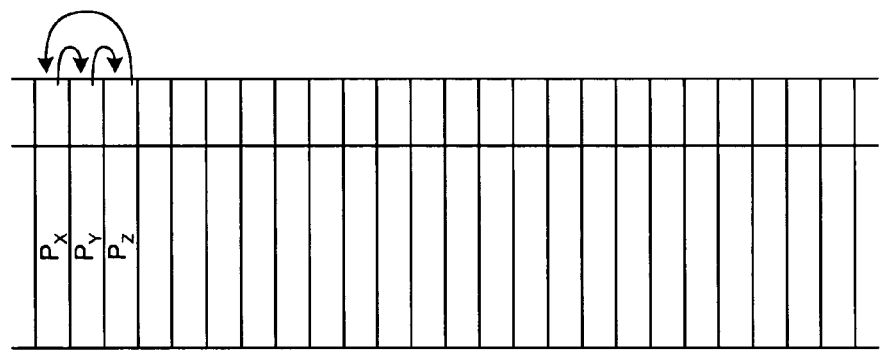
Figure 23

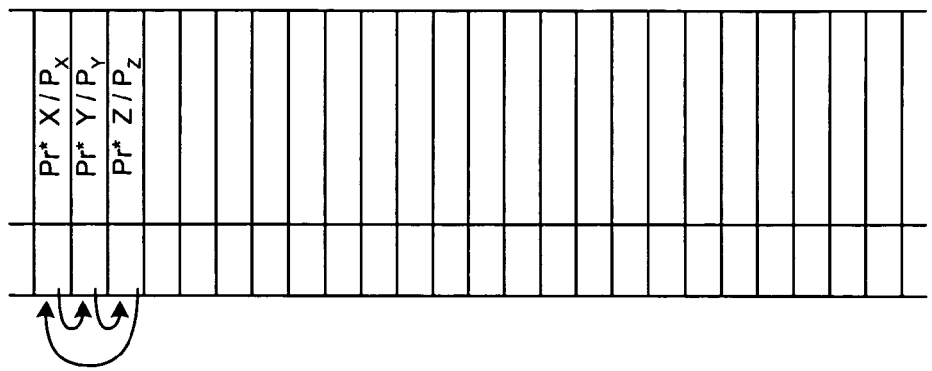
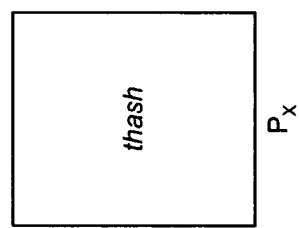
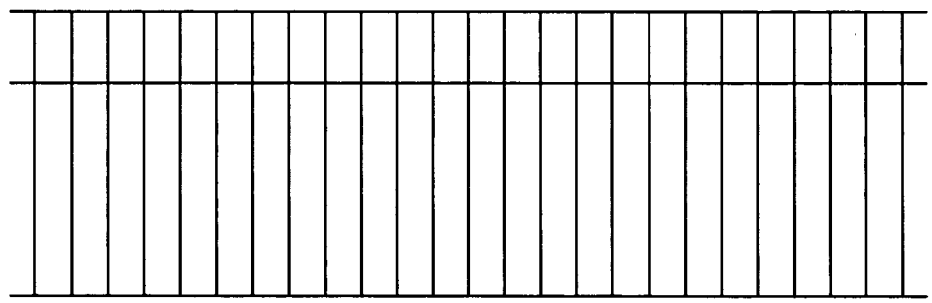
Figure 24

1

METHOD FOR PATCHING VIRTUALLY ALIASED PAGES BY A VIRTUAL-MACHINE MONITOR

TECHNICAL FIELD

The present invention is related to computer architecture, operating systems, and virtual-machine monitors, and, in particular, to methods, and virtual-machine monitors incorporating the methods, for patching virtual-memory pages that are aliased by a guest operating system.

BACKGROUND OF THE INVENTION

During the past 50 years, computer hardware, architecture, and operating systems that run on computers have evolved to provide ever-increasing storage space, execution speeds, and features that facilitate computer intercommunication, security, application-program development, and ever-expanding range of compatibilities and interfaces to other electronic devices, information-display devices, and information-storage devices. In the 1970's, enormous strides were made in increasing the capabilities and functionalities of operating systems, including the development and commercial deployment of virtual-memory techniques, and other virtualization techniques, that provide to application programs the illusion of extremely large address spaces and other virtual resources. Virtual memory mechanisms and methods provide 32-bit or 64-bit memory-address spaces to each of many user applications concurrently running on computer system with far less physical memory.

Virtual machine monitors provide a powerful new level of abstraction and virtualization. A virtual machine monitor comprises a set of routines that run directly on top of a computer machine interface, and that, in turn, provides a virtual machine interface to higher-level programs, such as operating systems. An operating system, referred to as a "guest operating system," runs above, and interfaces to, a well-designed and well-constructed virtual-machine interface just as the operating system would run above, and interface to, a bare machine.

A virtual-machine monitor uses many different techniques for providing a virtual-machine interface, essentially the illusion of a machine interface to higher-level programs. A virtual-machine monitor may pre-process operating system code to replace privileged instructions and certain other instructions with patches that emulate these instructions. The virtual-machine monitor generally arranges to intercept and emulate the instructions and events which behave differently under virtualization, so that the virtual-machine monitor can provide virtual-machine behavior consistent with the virtual machine definition to higher-level software programs, such as guest operating systems and programs that run in program-execution environments provided by guest operating systems. The virtual-machine monitor controls physical machine resources in order to fairly allocate physical machine resources among concurrently executing operating systems and preserve certain physical machine resources, or portions of certain physical machine resources, for exclusive use by the virtual-machine monitor.

Many modern processor architectures allow an operating system to map a particular physical page to a number of different virtual-page addresses. This one-to-many mapping is referred to as virtual aliasing. Virtual aliasing presents particular problems to virtual-machine monitors attempting to emulate branch instructions resident on virtually aliased pages. For this reason, designers, implementers, manufacturers, and users of virtual-machine monitors and virtual-monitor-containing computer systems have recognized the need for efficient methods by which virtual-machine monitors can correctively introduce branch instructions into virtually-aliased guest-operating-system pages in order to emulate certain instructions.

SUMMARY OF THE INVENTION

Various embodiments of the present invention are directed to methods by which a virtual-machine monitor can introduce branch instructions, in order to emulate privileged and other instructions on behalf of a guest operating system, into guest-operating-system code residing on virtually aliased virtual-memory pages. In a described embodiment of the present invention, the virtual-machine monitor physically aliases each virtual alias for a particular physical memory page by allocating a physical page for the virtual alias, copying the original contents of the physical memory page to the allocated physical page, or physical alias page, and subsequently patching each physical alias page appropriate to the physical address of the physical alias page.

BRIEF DESCRIPTION OF THE DRAWINGS

FIG. 2 illustrates a monitor-based approach to supporting multiple, concurrently executing operating systems.

FIGS. 3A–B show the registers within an Itanium processor.

FIG. 7 shows the access rights encoding used in a TLB entry.

FIG. 17 shows two tables that facilitate an approach to patching virtual-address-aliased memory pages according to one embodiment of the present invention.

FIG. 22 illustrates how the virtual-machine monitor handles a key permission fault generated by an attempt by a guest operating system to access a virtually aliased virtual-memory page in one embodiment of the present invention.

FIGS. 23–24 illustrate how the virtual-machine monitor handles an attempt by a guest operating system to access a patched, virtual-address-aliased virtual-memory page for a write operation in one embodiment of the present invention.

DETAILED DESCRIPTION OF THE INVENTION

Embodiments of the present invention are directed to methods for handling aliased patched pages by a virtual-machine monitor that patches guest-operating-system executable code in order to emulate various privileged and unprivileged instructions that, for a variety of reasons, the virtual-machine monitor cannot allow the guest operating system to directly execute. The virtual-machine monitor commonly replaces an instruction that the virtual-machine monitor wishes to emulate within guest-operating-system executable code with a branch instruction that directs execution to a virtual-monitor patch that emulates the replaced instruction. A described embodiment makes use of Intel Itanium® architecture features. Additional information concerning virtual memory, virtual-machine monitors, and the Itanium architecture are first provided, in a following subsection, followed by a detailed discussion of several embodiments of the present invention, in a subsequent subsection.

Figure 1:
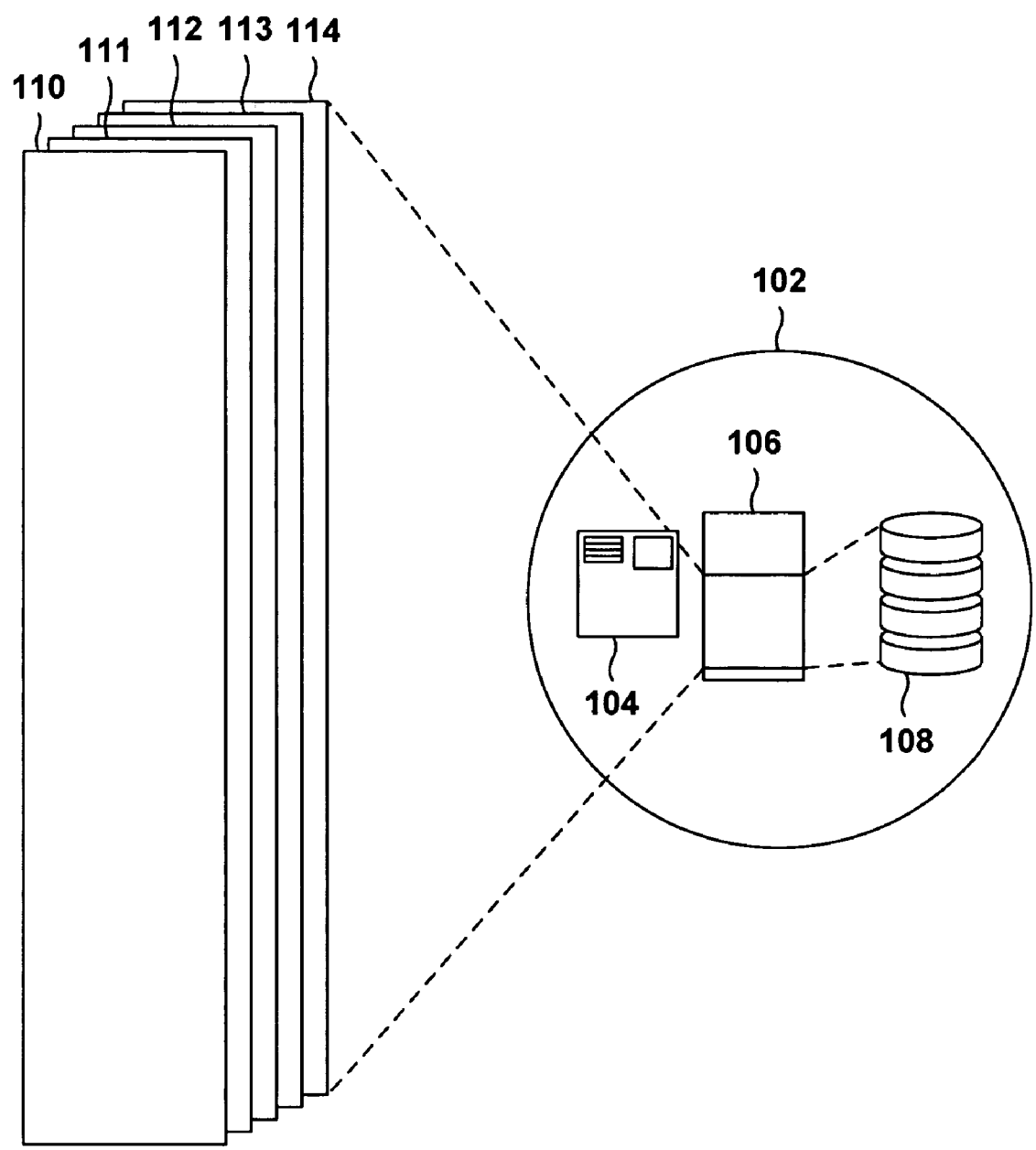
FIG. 1 illustrates virtual memory provided by a combined operating-system/hardware system.

Additional Information About Virtual Memory, Virtual Monitors, and the Intel® Itanium Computer Architecture Virtual Memory FIG. 1 illustrates virtual memory provided by a combined operating-system/hardware system. In FIG. 1, the operating system is abstractly represented as a circle 102 enclosing hardware components including a processor 104, physical memory 106, and mass-storage devices 108. FIG. 1 is intended to abstractly represent certain features of the hardware system, or machine, rather than to accurately represent a machine or enumerate the components of a machine. In general, the operating system provides, to each process executing within the execution environment provided by the operating system, a large virtual-memory address space, represented in FIG. 1 by vertical columns external to the operating system, such as vertical column 110. The virtual-memory address space defines a sequence of addressable memory bytes with addresses ranging from 0 to $2^{64}-1$ for a combined operating-system/hardware system supporting 64-bit addresses. The Itanium virtual address space is up to 85 bits wide, comprising a 61-bit offset and a 24-bit region selector, with a 64-bit address space accessible at any point in time. Depending on the machine and operating system, certain portions of the virtual-memory address space may be inaccessible to a process, and various mechanisms may be used to extend the size of the virtual-memory address space beyond the maximum size addressable by the machine-supported addressing unit. An operating system generally provides a separate virtual-memory address space to each process concurrently executing on top of the operating system, so that, as shown in FIG. 1, the operating system may simultaneously support a number of distinct and separate virtual-memory address spaces 110–114.

A virtual-memory address space is, in many respects, an illusion created and maintained by the operating system. A process or thread executing on the processor 104 can generally access only a portion of physical memory 106. Physical memory may constitute various levels of caching and discrete memory components distributed between the processor and separate memory integrated circuits. The physical memory addressable by an executing process is often smaller than the virtual-memory address space provided to a process by the operating system, and is almost always smaller than the aggregate size of the virtual-memory address spaces simultaneously provided by the operating system to concurrently executing processes. The operating system creates and maintains the illusion of relatively vast virtual-memory address spaces by storing the data, addressed via a virtual-memory address space, on mass-storage devices 108 and rapidly swapping portions of the data, referred to as pages, into and out from physical memory 106 as demanded by virtual-memory accesses made by executing processes. In general, the patterns of access to virtual memory by executing programs are highly localized, so that, at any given instant in time, a program may be reading to, and writing from, only a relatively small number of virtual-memory pages. Thus, only a comparatively small fraction of virtual-memory accesses require swapping of a page from mass-storage devices 108 to physical memory 106.

Virtual Monitors

A virtual-machine monitor is a set of routines that lie above the physical machine interface, and below all other software routines and programs that execute on a computer system. A virtual-machine monitor, also referred to as a "hypervisor" or simply as a "monitor," provides a virtual-machine interface to each operating system concurrently executing on the computer system. The virtual-machine interface includes those machine features and characteristics expected of a machine by operating systems and other programs that execute on machines. For example, a virtual-machine interface includes a virtualized virtual-memory-system interface. FIG. 2 illustrates a virtual-monitor-based approach to supporting multiple, concurrently executing operating systems. In FIG. 2, a first circle 202 encloses the physical processor 204, physical memory 206, and mass-storage devices 208 of a computer system. The first enclosing circle 202 represents a virtual-machine monitor, a software layer underlying the traditional operating-system software layer of the computer system. The virtual-machine monitor provides virtual-machine interfaces 210 and 212. The virtual machine can be considered to include a virtual processor, virtual physical memory, and virtual mass-storage devices, e.g., 214, 216, 218, respectively. An operating system software layer can be considered to encapsulate each virtual machine, such as operating systems 220 and 222 represented by circles in FIG. 2. In turn, the operating systems each provide a number of guest-virtual-memory address spaces 224 and 226 to processes concurrently executing within the execution environments provided by the operating systems. The virtual-machine monitor may provide multiple virtual processors to guest operating systems, and may provide a different number of virtual processors than the number of physical processors contained in the computer system.

Intel Itanium® Architecture

Figure 3A:
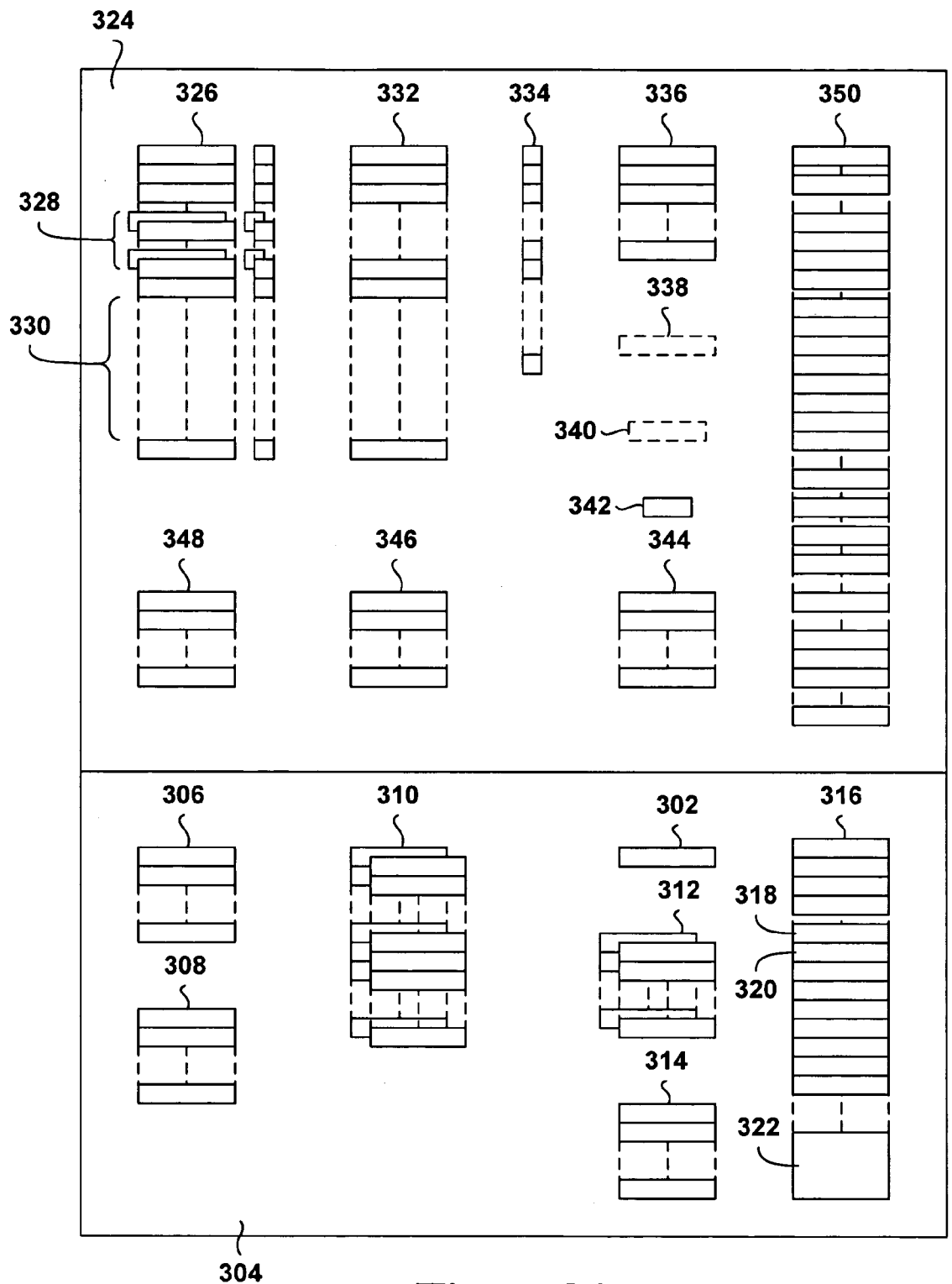
Figure 4:
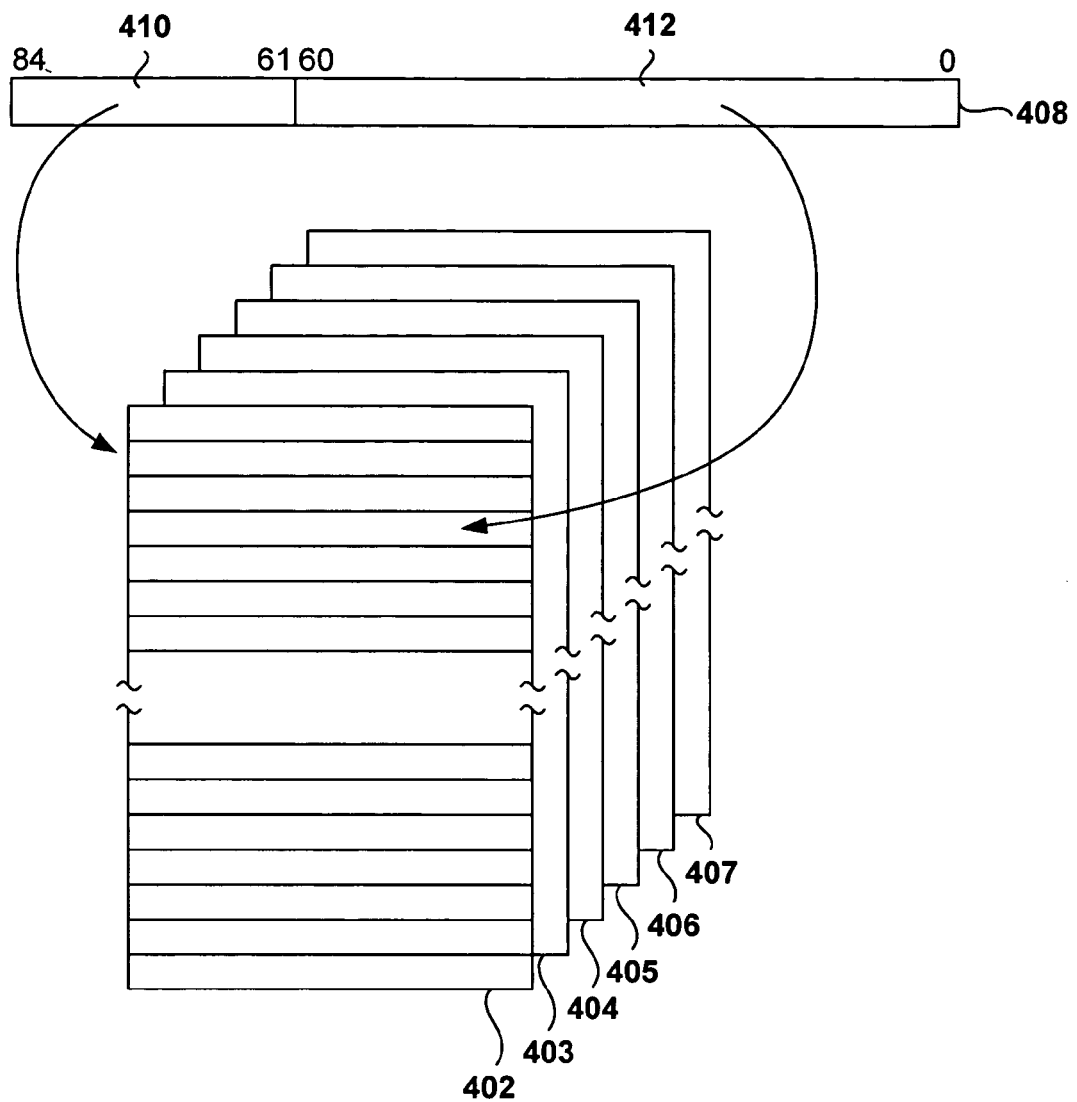
FIG. 4 illustrates the virtual address space provided by one modern computer architecture.

Processors, such as Intel Itanium® processors, built to comply with the Intel® Itanium computer architecture represent one example of a modern computer hardware platform suitable for supporting a monitor-based virtual machine that in turn supports multiple guest-operating-systems, in part by providing a virtual physical memory and virtual-address translation facilities to each guest operating system. FIGS. 3A–B show the registers within an Itanium processor. FIG. 3A is a block diagram showing the registers within the processor. The registers hold values that define the execution state of the processor, and, when saved to memory, capture the machine state of an executing process prior to stopping execution of the process. Restoring certain registers saved in memory allows for resumption of execution of an interrupted process. The register set shown in FIGS. 3A–B is quite complex, and only certain of the registers are described, below.

The process status register ("PSR") 302 is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The most privileged privilege level is privilege level 0. The least privileged privilege level is privilege level 3. Only processes executing at privilege level 0 are allowed to access and manipulate certain machine resources, including the subset of registers, known as the "system-register set," shown in FIG. 3A within the lower rectangle 304. One control register, the interruption processor status register ("IPSR") 318, stores the value of the PSR for the most recently interrupted process. The interruption status register ("ISR") 320 contains a number of fields that indicate the nature of the interruption that most recently occurred to an interruption handler when the PSR.ic field flips from "1," at the time of a fault or interrupt, to "0" as the interruption handler is invoked. Other control registers store information related to other events, such as virtual memory address translation information related to a virtual address translation fault, pointers to the last successfully executed instruction bundle, and other such information. Sets of external interrupt control registers 322 are used, in part, to set interrupt vectors. The IHA register stores an indication of a virtual hash page table location at which the virtual-address translation corresponding to a faulting virtual address should be found.

The registers shown in FIG. 3A in the upper rectangular region 324 are known as the "application-register set." These registers include a set of general registers 326, sixteen of which 328 are banked in order to provide immediate registers for interruption handling code. At least 96 general registers 330 form a general-register stack, portions of which may be automatically stored and retrieved from backing memory to facilitate linkages among calling and called software routines. The application-register set also includes floating point registers 332, predicate registers 334, branch registers 336, an instruction pointer 338, a current frame marker 340, a user mask 342, performance monitor data registers 344, processor identifiers 346, an advanced load address table 348, and a set of specific application registers 350.

FIG. 3B shows another view the registers provided by the Itanium architecture, including the 128 64-bit general purpose registers 354, a set of 128 82-bit floating point registers 356, a set of 64 predicate registers 358, a set of 64 branch registers 360, a variety of special purpose registers including application registers ("AR") $AR_0$ through $AR_{127}$ 366, an advance load address table 368, process-identifier registers 370, performance monitor data registers 372, the set of control registers ("CR") 374, ranging from $CR_0$ to $CR_{81}$, the PSR register 376, break point registers 378, performance monitor configuration registers 380, a translation lookaside buffer 382, region registers 384, and protection key registers 386. Note that particular AR registers and CR registers have acronyms that reflect their use. For example, AR register $AR_{17}$ 388, the backing-store-pointer register, is associated with the acronym BSP, and this register may be alternatively specified as the BSP register or the AR[BSP] register. In many of the registers, single bits or groups of bits comprise fields containing values with special meanings. For example, the two least significant bits within register AR[RSC] 390 together compose a mode field which controls how aggressively registers are saved and restored by the processor. These two bits can be notationally specified as "AR[RSC] .mode."

The memory and virtual-address-translation architecture of the Itanium computer architecture is described below, with references to FIGS. 4–7. The virtual address space defined within the Intel Itanium computer architecture includes $2^{24}$ regions, such as regions 402–407 shown in FIG. 4, each containing $2^{61}$ bytes that are contiguously addressed by successive virtual memory addresses. Thus, the virtual memory address space can be considered to span a total address space of $2^{85}$ bytes of memory. An 85-bit virtual memory address 408 can then be considered to comprise a 24-bit region field 410 and a 61-bit address field 412.

Figure 5:
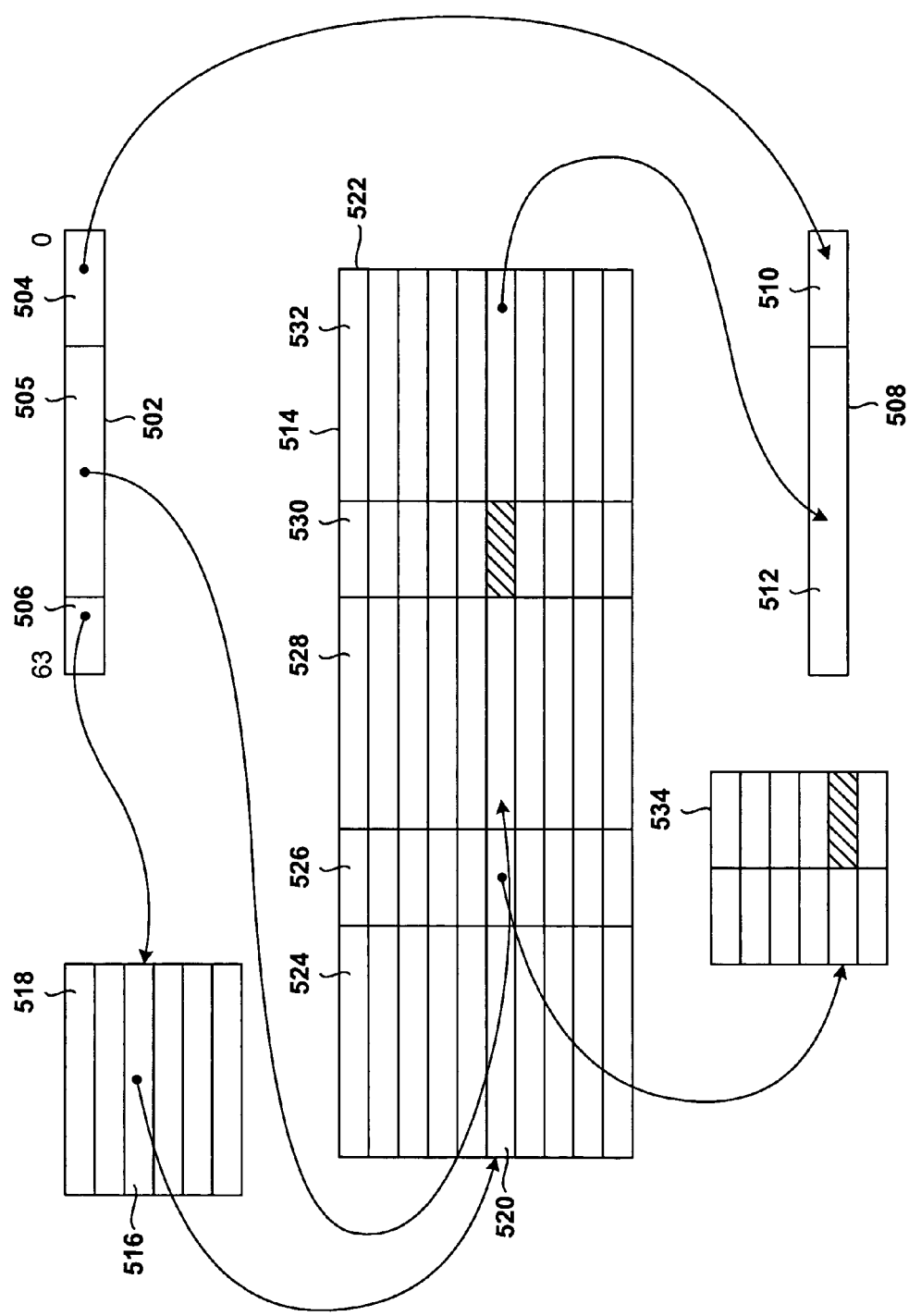
FIG. 5 illustrates translation of a virtual memory address into a physical memory address via information stored within region registers, protection key registers, and a translation look-aside buffer.

In general, however, virtual memory addresses are encoded as 64-bit quantities. FIG. 5 illustrates translation of a 64-bit virtual memory address into a physical memory address via information stored within region registers, protection key registers, and a translation look-aside register buffer ("TLB"). In the Intel® Itanium architecture, virtual addresses are 64-bit computer words, represented in FIG. 5 by a 64-bit quantity 502 divided into three fields 504–506. The first two fields 504 and 505 have sizes that depend on the size of a memory page, which can be adjusted within a range of memory page sizes. The first field 504 is referred to as the "offset." The offset is an integer designating a byte within a memory page. If, for example, a memory page contains 4096 bytes, then the offset needs to contain 12 bits to represent the values 0–4095. The second field 505 contains a virtual page address. The virtual page address designates a memory page within a virtual address space that is mapped to physical memory, and further backed up by memory pages stored on mass storage devices, such as disks. The third field 506 is a three-bit field that designates a region register containing the identifier of a region of virtual memory in which the virtual memory page specified by the virtual page address 505 is contained.

One possible virtual-address-translation implementation consistent with the Itanium architecture is next discussed. Translation of the virtual memory address 502 to a physical memory address 508 that includes the same offset 510 as the offset 504 in the virtual memory address, as well as a physical page number 512 that references a page in the physical memory components of the computer system, is carried out by the processor, at times in combination with operating-system-provided services. If a translation from a virtual memory address to a physical memory address is contained within the TLB 514, then the virtual-memoryaddress-to-physical-memory-address translation can be entirely carried out by the processor without operating system intervention. The processor employs the region register selector field 506 to select a register 516 within a set of region registers 518. The selected region register 516 contains a 24-bit region identifier. The processor uses the region identifier contained in the selected region register and the virtual page address 505 together in a hardware function to select a TLB entry 520 containing a region identifier and virtual memory address that match the region identifier contained in the selected region register 516 and the virtual page address 505. Each TLB entry, such as TLB entry 522, contains fields that include a region identifier 524, a protection key associated with the memory page described by the TLB entry 526, a virtual page address 528, privilege and access mode fields that together compose an access rights field 530, and a physical memory page address 532.

If a valid entry in the TLB, with present bit=1, can be found that contains the region identifier contained within the region register specified by the region register selector field of the virtual memory address, and that entry contains the virtual-page address specified within the virtual memory address, then the processor determines whether the virtual-memory page described by the virtual-memory address can be accessed by the currently executing process. The currently executing process may access the memory page if the access rights within the TLB entry allow the memory page to be accessed by the currently executing process and if the protection key within the TLB entry can be found within the protection key registers 534 in association with an access mode that allows the currently executing process access to the memory page. Protection-key matching is required only when the PSR.pk field of the PSR register is set. The access rights contained within a TLB entry include a 3-bit access mode field that indicates one, or a combination of, read, write, and execute privileges, and a 2-bit privilege level field that specifies the privilege level needed by an accessing process. Each protection key register contains a protection key of up to 24 bits in length associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware may attempt to locate the correct TLB entry from an architected mapping control table, called the virtual hash page table ("VHPT"), located in protected memory, using a hardware-provided VHPT walker. If the hardware is unable to locate the correct TLB entry from the VHPT, a TLB-miss fault occurs and a kernel or operating system is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the kernel or operating system does not find a valid protection key within the protection key registers 534, if the attempted access by the currently executing process is not compatible with the access mode in the TLB entry or the read/write/execute bits within the protection key in the protection key register, or if the privilege level at which the currently executing process executes is less privileged than the privilege level needed by the TLB entry, then a fault occurs that is handled by a processor dispatch of execution to operating system code.

Figure 6:
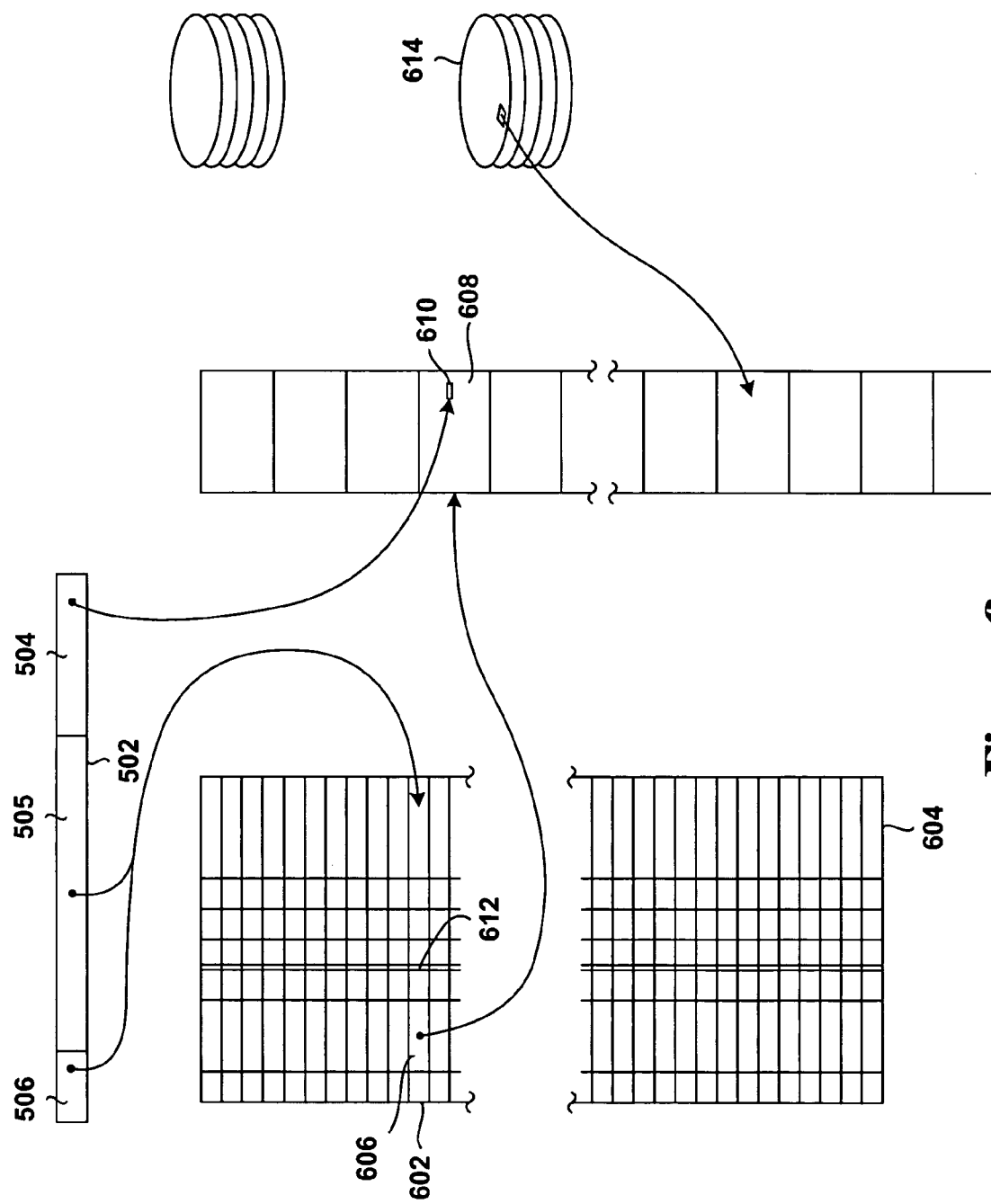
FIG. 6 shows the data structures employed by an operating system to find a memory page in physical memory corresponding to a virtual memory address.

FIG. 6 shows one form of a data structure employed by an operating system to find a memory page in physical memory corresponding to a virtual memory address. The virtual memory address 502 is shown in FIG. 6 with the same fields and numerical labels as in FIG. 5. The operating system employs the region selector field 506 and the virtual page address 505 to select an entry 602 within a virtual page table 604. The virtual page table entry 602 includes a physical page address 606 that references a page 608 in physical memory. The offset 504 of the virtual memory address is used to select the appropriate byte location 610 in the virtual memory page 608. The virtual page table 602 includes a bit field 612 indicating whether or not the physical address is valid. If the physical address is not valid, then the operating system commonly selects a memory page within physical memory to contain the memory page, and retrieves the contents of the memory page from an external storage device, such as a disk drive 614. The virtual page table entry 602 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

FIG. 7 shows the access rights encoding used in a TLB entry. Access rights comprise a 3-bit TLB.ar mode field 702 that specifies read, write, execute, and combination access rights, and a 2-bit TLB.pl privilege level field 704 that specifies the privilege level associated with a memory page. In FIG. 7, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by processes running at any privilege level, shown in FIG. 7 by the letter "R" in the column corresponding to each privilege level 706–709, while a memory page described by a TLB entry with TLB.ar equal to 0 and TLB.pl equal to 0 can be accessed by reading only by a process running at privilege level 0, as indicated in FIG. 7 by the letter "R" 710 under the column corresponding to privilege level 0. The access rights described in FIG. 7 nest by privilege level according to the previous discussion with reference to FIG. 4. In general, a process running at a particular privilege level may access a memory page associated with that privilege level and all less privileged privilege levels. Using only the access rights contained in a TLB entry, it is not possible to create a memory region accessible to a process running at level 3 and the kernel running at level 0, but not accessible to an operating system running at privilege level 2. Any memory page accessible to a process running at privilege level 3 is also accessible to an operating system executing at privilege level 2.

Figure 8A:
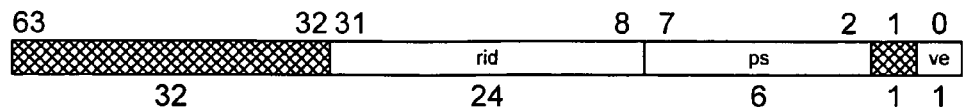
FIGS. 8A–B provide details of the contents of a region register and the contents of a VHPT long-format entry.
Figure 8B:
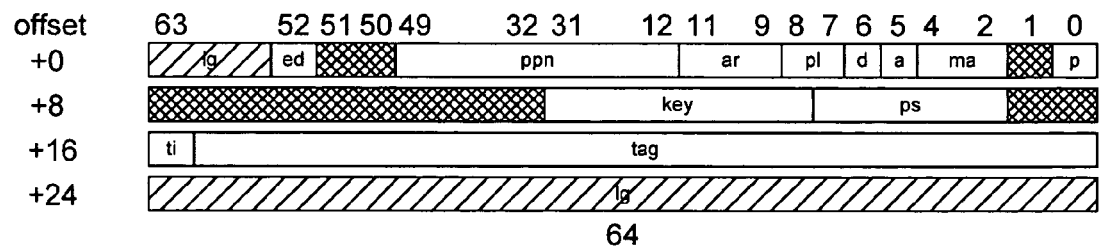

FIGS. 8A–B provide details of the contents of a region register and the contents of a VHPT long-format entry, respectively. As shown in FIG. 8A, a region register includes the following fields: (1) "ve," a 1-bit Boolean field indicating whether or not the VHPT walker is enabled; (2) "ps," a 6-bit field indicating a preferred page size for the region, where the preferred page size is $2^{ps}$; and (3) "RID," a 24-bit region identifier. A VHPT long-format entry, as shown in FIG. 8B, includes the following fields: (1) "p," a 1-bit Boolean field indicating whether or not the corresponding page is resident in physical memory and other fields in the entry contain meaningful information; (2) "ma," a 3-bit field, called "memory attribute," which describes caching, coherency, write-policy, and speculative characteristics of the mapped physical page; (3) "a," a 1-bit field that, when zero, causes references to the corresponding page to generate access faults; (4) "d," a 1-bit Boolean field that specifies generation of dirty-bit faults upon store or semaphore references to the corresponding page; (5) "pl," a 2-bit field indicating the privilege level for the corresponding page; (6) "ar," a 3-bit access-rights field that includes the read, write, and execute permissions for the page; (7) "ppn," a 38-bit field that stores the most significant bits to the mapped physical address; (8) "ed," a 1-bit Boolean field whose value contributes to determining whether to defer a speculative load instruction; (9) "ps," a 6-bit field indicating the page size for virtual-memory mapping; (10) "key," a protection key associated with the corresponding virtual page; (11) "tag," a translation tag used for hash-based searching of the VHPT; and (12) "ti," a 1-bit Boolean field indicating whether or not the translation tag is valid.

Figure 9A:
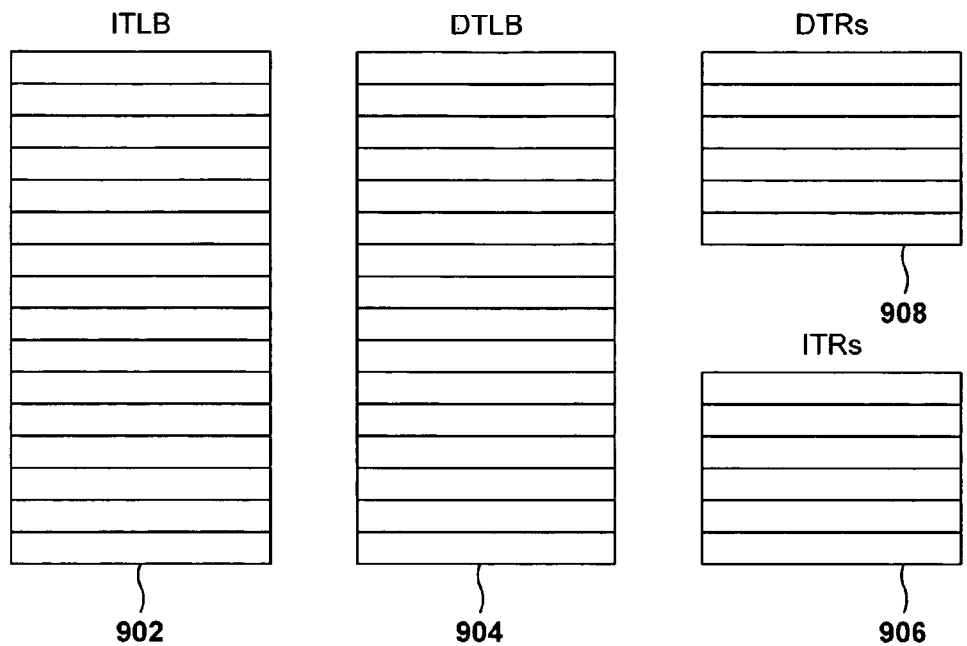
FIGS. 9A–B provide additional details about the virtual-memory-to-physical-memory translation caches and the contents of translation-cache entries.
Figure 9B:
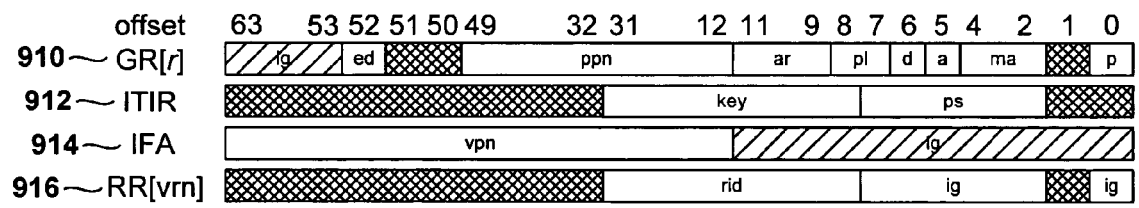

FIGS. 9A–B provide additional details about the virtual-memory-to-physical-memory translation caches and the contents of translation-cache entries. The Itanium provides four translation structures, as shown in FIG. 9A. These include an instruction TLB ("ITLB"), a data TLB ("DTLB") 904, a set of instruction translation registers ("ITRs") 906, and a set of data translation registers ("DTRs") 908. The four translation structures are together referred to as the "TLB." Entries are placed into the ITLB, DTLB, ITRs, and DTRs by using the privileged instructions itc.i, itc.d, itr.i, and itr.d, respectively. As discussed above, the ITLB and DTLB serve as a first cache for virtual-memory-to-physical-memory translations.

FIG. 9B shows the contents of registers used to insert translation-cache entries into the TLB using the above-described privileged instructions. The contents of four different registers are employed: (1) a general register 910 specified as an operand to the privileged instruction, the interruption TLB insertion register ("ITIR") 912, the interruption faulting address register ("IFA") 914, and the contents of the region register 916 selected by the most significant 3 bits of the IFA register 914. Many of the fields shown in FIG. 9B are identical to the fields in the VHPT long-format entry, shown in FIG. 8B, and are not again described, in the interest of brevity. The field "vpn" in the IFA register contains the most significant bits of a virtual-memory address. In both a VHPT entry and a translation-cache entry, the most significant bits of a physical page address and virtual-memory-page address (with page-offset bits assumed to be 0) represent the address of a first byte of a physical page and virtual-memory page, respectively. Thus, VHPT entries and TLB entries are referred to as corresponding both to virtual-memory addresses and to virtual-memory pages. The unspecified, least-significant bits of a physical-memory address or virtual-memory address an offset, in bytes, within the physical memory or virtual memory page specified by the most significant bits.

Figure 10:
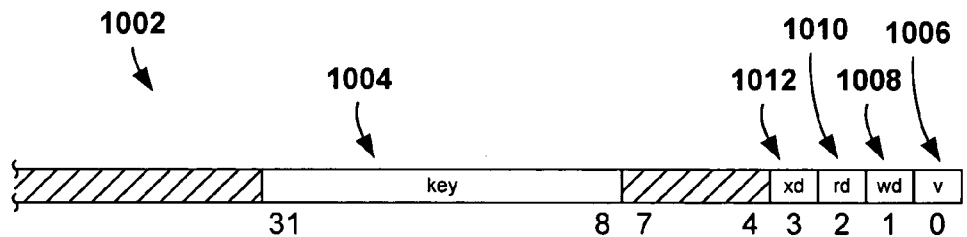
FIG. 10 provides additional details regarding the contents of protection-key registers.

FIG. 10 provides additional details regarding the contents of protection-key registers. The format for a protection-key register 1002 includes a 24-bit key field 1004 and four different single-bit fields that include: (1) a valid bit 1006, which indicates whether or not the protection-key register contains valid contents and is therefore employed by the processor during virtual-address translation; (2) a write-disable bit 1008, which, when set, results in write access denied to pages, the translations for which include the protection key contained in the protection-key field 1004; (3) a read-disable bit, which, when set, disables read access to pages, the translations for which contain the key contained in the key field 1004; and (4) an execute-disable bit 1012, which, when set, prevents execute access to pages, the translations for which contain the key contained in the key field 1004. The read-disable, write-disable, and execute-disable bits in protection key registers provide an additional mechanism to control access to pages, on a key-domain basis rather than on a per-page-access-rights basis.

Embodiments of the Present Invention

Figure 11:
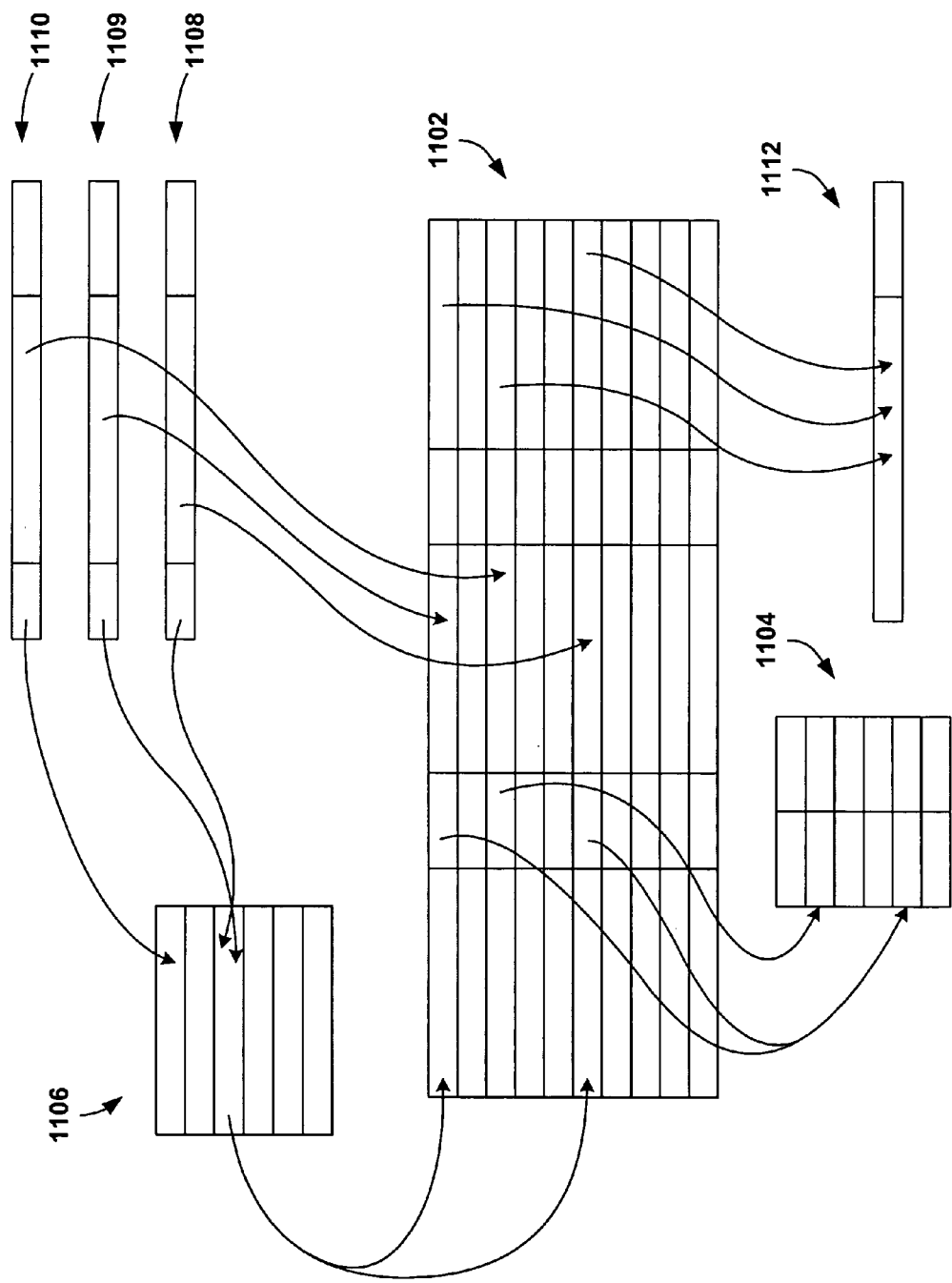
FIG. 11 illustrates virtual address aliasing.

FIG. 11 illustrates virtual address aliasing. FIG. 11 shows the virtual-address translation mechanism provided by the Itanium architecture, discussed above with reference to FIG. 5. FIG. 11 again shows the translation lookaside buffer 1102, protection-key registers 1104, the region registers 1106, three different virtual addresses 1108–1110, and a physical address 1112 to which all three virtual addresses 1108–1110 translate. When more than one virtual address, such as virtual addresses 1108–1110, translates to a single physical address, such as physical address 1112, the virtual addresses are virtual-address aliases of one another. The Itanium architecture, and many other modern computer architectures, support virtual-address aliasing. Guest operating systems may assume virtual-address-aliasing support, and may employ virtual-address aliasing for various different reasons. Therefore, a virtual-machine monitor providing a virtual-machine interface to guest operating systems needs also to support virtual-address aliasing in a reasonably efficient manner.

Figure 12:
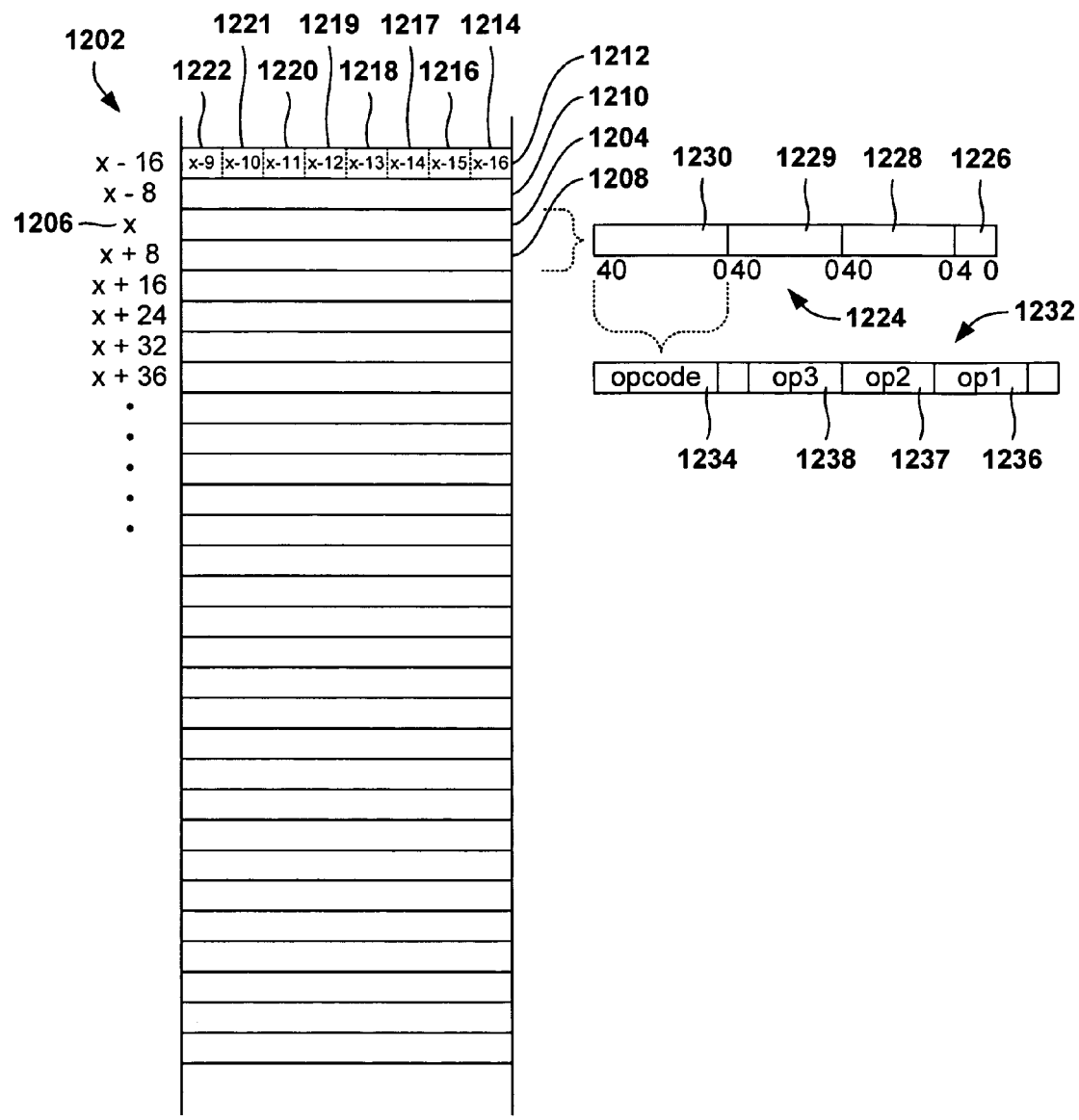
FIG. 12 illustrates a portion of a computer memory and storage of a portion of an executable program in the portion of computer memory.

FIG. 12 illustrates a portion of a computer memory and storage of a portion of an executable program in the portion of computer memory. The memory layout and executable-code formatting shown in FIG. 12 is that of the Intel® Itanium architecture. Different types of computers, implemented according to different types of computer architectures, employ different memory and executable-code conventions. However, the principles illustrated for the Itanium-architecture memory and executable-code conventions are general, and apply over a broad range of different types of computers and computer architectures. The computer memory, represented in FIG. 12 by a column 1202 of 64-bit memory words, can be considered to be a very long, ordered sequence of computer words, each word having a distinct address. In general, a computer architecture specifies a natural word size, in the case of Itanium architecture, 64 bits or eight bytes. Different computer architectures and types of computers specify different natural word lengths. For example, in current personal computers ("PCs"), the natural word length is generally 32 bits or four bytes. Different computer architectures and types of computers use different granularities of addressability. In the Itanium architecture, the granularity of addressability is configurable over a range of granularities. For purposes of discussing the present invention, it is assumed that the granularity of addressability is a single byte. The eight bytes within a particular 64-bit natural word in memory are ordered sequentially from a lowest-addressed byte to a highest-addressed byte. Similarly, the bits within each byte, and the bits within an entire word, are also ordered from a least-significant bit to a most-significant bit.

In FIG. 12, an arbitrarily selected 64-bit word 1204 is assigned, for descriptive purposes, the arbitrary address "X" 1206. In general, memory-word addresses are of length 64 bits, so that each natural computer word can store a single address. The address "X" is the byte address of the least significant byte, or lowest-addressed byte, in the 64-bit computer word 1204. The address of the next computer word 1208 in memory is therefore "X+8," and the address of the previous word 1210 is "X−8." The individual bytes within the 64-bit word 1212 at address "X−16" are explicitly shown in FIG. 12, labeled with their byte addresses. The first, lowest-addressed byte 1214 is shown in FIG. 12 with address "X−16," and the next, successive, higher-addressed bytes 1216–1222 appear, to the left of the lowest-addressed byte 1214 within computer word 1212. The memory layout and addressing conventions illustrated in FIG. 12 apply both to memory that stores executable code as well as memory that stores data. Whether the contents of a memory page are executable or data may be fully or partially determined by the access rights associated with the page, and if not fully determined by the access rights, are ultimately determined by whether or not a stored program attempts to execute what the stored program considers to be instructions within the page.

In the Intel® Itanium architecture, computer instructions are stored in 128-bit bundles. Each 128-bit, or 16-byte, instruction bundle includes three instructions. For example, in FIG. 12, the two, adjacent computer words at addresses "X" and "X+8" 1204 and 1208 together store a single instruction bundle 1224. The instruction bundle 1224 includes a first, five-bit field 1226 that encodes a value that directs the instruction bundle to a particular type of instruction-execution subunit within an Itanium processor. The instruction bundle 1224 additionally contains three instructions 1228–1230, each of length 41 bits. Each instruction, in turn, contains a number of different fields. In FIG. 12, an expanded view of the last instruction 1230 in instruction bundle 1224 is shown 1232 below the instruction bundle 1224. The formats for instructions vary significantly from instruction to instruction. However, in general, an instruction contains an op code 1234, and most instructions include operands, or arguments. For example, instruction 1232 in FIG. 12 includes three operands 1236–1238. In memory containing a stored program, each successive pair of 64-bit words contains a next instruction bundle. In older computer architectures, instructions are executed in the order in which they are stored in memory. The Itanium architecture, like many modern processor architectures, is somewhat more complex, and features massive pipelining and parallel execution of as many as six instructions. However, for the purposes of describing the present invention, a stored program can be thought of as a sequence of successively stored instruction bundles within memory that are more or less sequentially executed in the order that they are stored, from lower addresses to higher addresses in memory. It should also be appreciated that, without knowing the access rights associated with a memory page containing a particular computer word, or knowing whether a particular computer word will be attempted to be executed by a program, it is impossible to determine, based on the contents of the computer word alone, whether the computer word represents stored data or one word of a two-word instruction bundle. In fact, the same memory word may be, in certain cases, treated as data, and, in other cases, executed as a portion of an instruction bundle.

Figure 13:
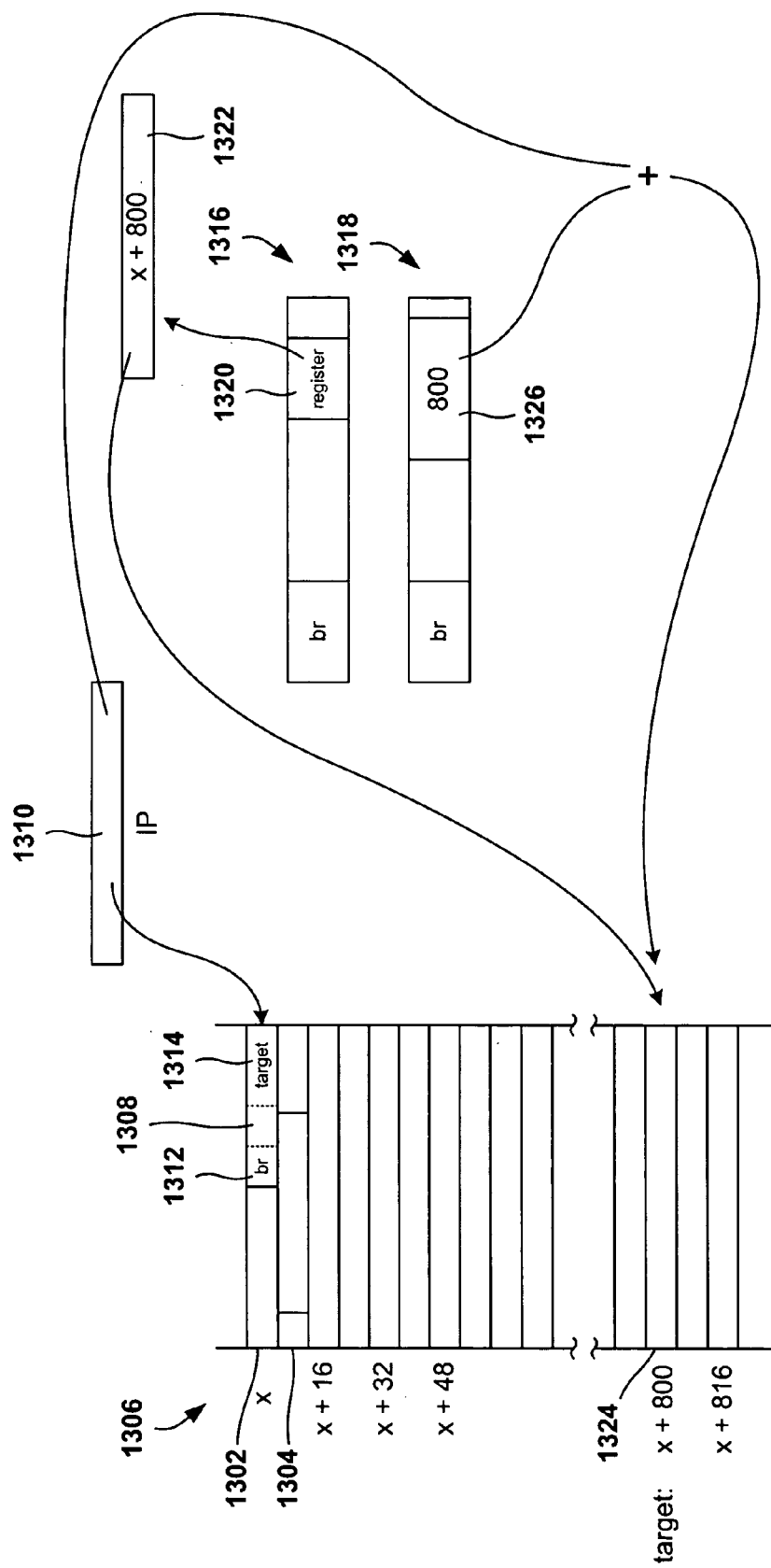
FIG. 13 illustrates immediate and register operands in the context of a branch instruction.

FIG. 13 illustrates immediate and register operands in the context of a branch instruction. As shown in FIG. 13, the 64-bit words 1302 and 1304 of a portion of memory 1306, at addresses "X" and "X+16," contain a three-instruction instruction bundle, the second instruction of which, 1308, is a branch instruction. A branch instruction is used to alter the contents of the IP register 1310 to contain the address of an instruction bundle other than the instruction bundle that follows the currently executing instruction bundle, thereby affecting a machine-level goto operation. As shown in FIG. 13, the branch instruction includes a numeric op code 1312 that specifies that the instruction is a branch instruction, as well as a single operand 1314 that specifies the target instruction bundle for the branch operation, or the destination instruction of the goto operation effected by the branch instruction. The target operand can be specified in several different ways in different subtypes of the branch instruction. In FIG. 13, an indirect branch instruction 1316 and an IP-relative branch instruction 1318 are illustrated. The target operand of the indirect branch instruction 1316 is a seven-bit field within the branch instruction that numerically specifies one of the 8 branch registers. For example, in FIG. 13, the branch-register field 1320 specifies a particular branch register 1322. If the branch instruction specifies a goto to a target instruction 1324 at address "X+800," then the branch register 1322 specified by the register operand 1320 of the indirection branch instruction 1316 contains the address "X+800." An indirection branch instruction 1316 can therefore transfer execution control to any 64-bit address accessible to the currently executing program. The IP-relative branch instruction 1318 has a target operand field 1326 that contains an offset from the address of the branch instruction to the target instruction to which execution is transferred by the branch instruction. Thus, for example, in FIG. 13, the target operand 1326 includes the numeric value "800," which is added to the contents of the IP register 1310 during execution of the IP-relative branch instruction 1318 in order to load the IP register with the address "X+800" of the target instruction 1324. The indirect branch instruction 1316 therefore includes a register operand, the most general type of operand for a computer instruction, while the IP-relative branch instruction 1318 includes an immediate operand, which, in the case of the IP-relative branch instruction, numerically encodes a value used during execution of the instruction. Note, because the immediate-operand, target field 1326 of the IP-relative branch instruction has a length, in bits, significantly shorter than the 64-bit natural word size, the IP-relative branch instruction can transfer execution control to other instructions only within a limited range of instructions preceding and following the branch instruction.

Figure 14:
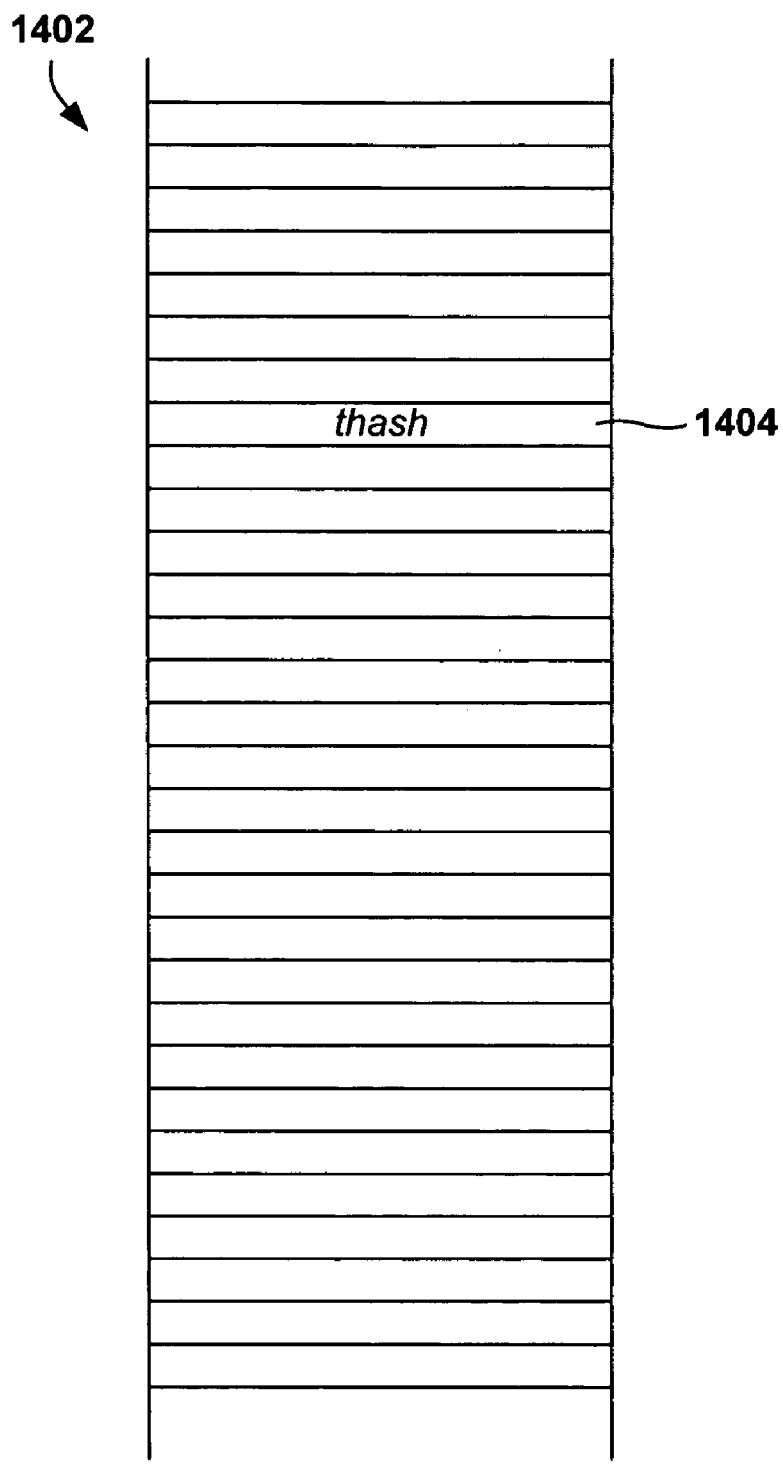
FIG. 14 shows a portion of a guest-operating-system virtual-memory page that includes a thash instruction.

FIG. 14 shows a portion of a guest-operating-system virtual-memory page that includes a thash instruction. In FIG. 14, and in subsequent figures, portions of virtual-memory pages are shown as columns 1402 of 64-bit words. In FIG. 14, the memory is shown as containing a single instruction in each memory word. The Itanium architecture stores three instructions in each pair of 64-bit words. An instruction-per-word convention is adopted in FIG. 14, and in subsequent figures, to facilitate discussion of instruction recognition without the overhead of the extra procedural steps needed dealing with bundled instructions. Those skilled in the art can appreciate that no generality is lost in adopting an instruction-per-word paradigm for describing embodiments of the present invention. Moreover, in many computer architectures, a single instruction is, in fact, stored in every natural word of a memory section storing executable code. The thash instruction 1404 appears in one of the 64-bit words of the virtual memory page. The thash instruction is an example of a non-privileged instruction that a virtual-machine monitor may choose to emulate as part of emulation of the virtual hash page table mechanism, discussed above. However, the mere presence of a thash instruction does not mean that a guest operating system intends for a virtual-memory page containing the thash instruction to be executable code or, if the page is intended to be executable code, does not mean that the guest operating system may not, at some point, treat the page as data and attempt to access the page with load and store operations.

Figure 15:
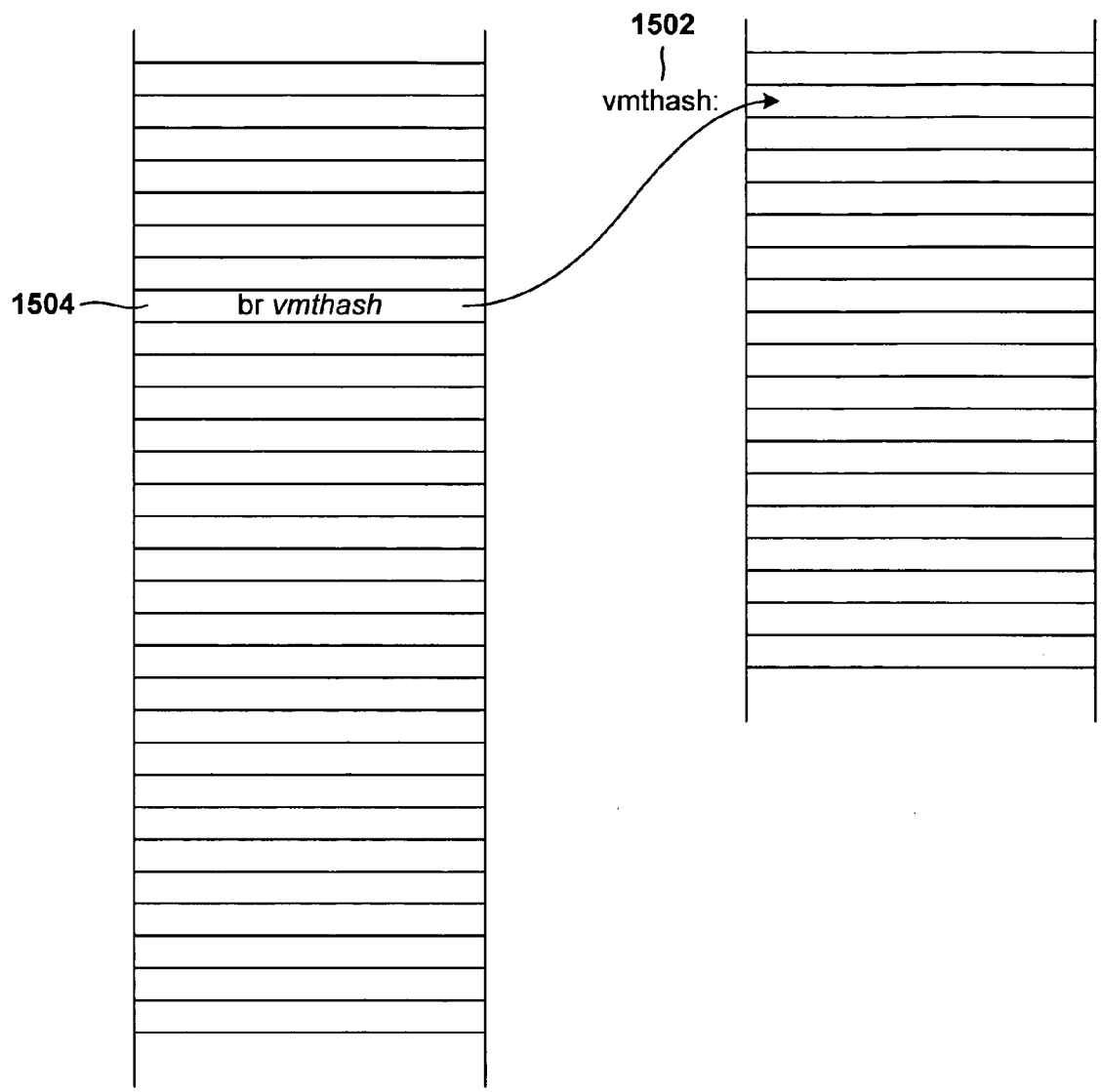
FIG. 15 shows a branch instruction inserted in place of the thash instruction in the portion of the virtual-memory page shown in FIG. 14.

A virtual-machine monitor may choose to patch pages containing thash instructions, and other instructions that the virtual-machine monitor wishes to emulate, prior to launching execution of a guest operating system or may choose to dynamically patch pages immediately prior to execution of instructions on pages. In either case, the virtual-machine monitor generally replaces the instruction to be emulated with a branch instruction that transfers execution to a virtual-memory patch instruction block for emulation of the instruction. FIG. 15 shows a branch instruction inserted in place of the thash instruction in the portion of the virtual-memory page shown in FIG. 14. In general, the branch instruction transfers control to the virtual-monitor emulation patch code, labeled in FIG. 15 by the label "vmthash," 1502, at a virtual-memory location within IP-relative branching distance from the branch instruction 1504 inserted in place of the instruction to be emulated.

Figure 16:
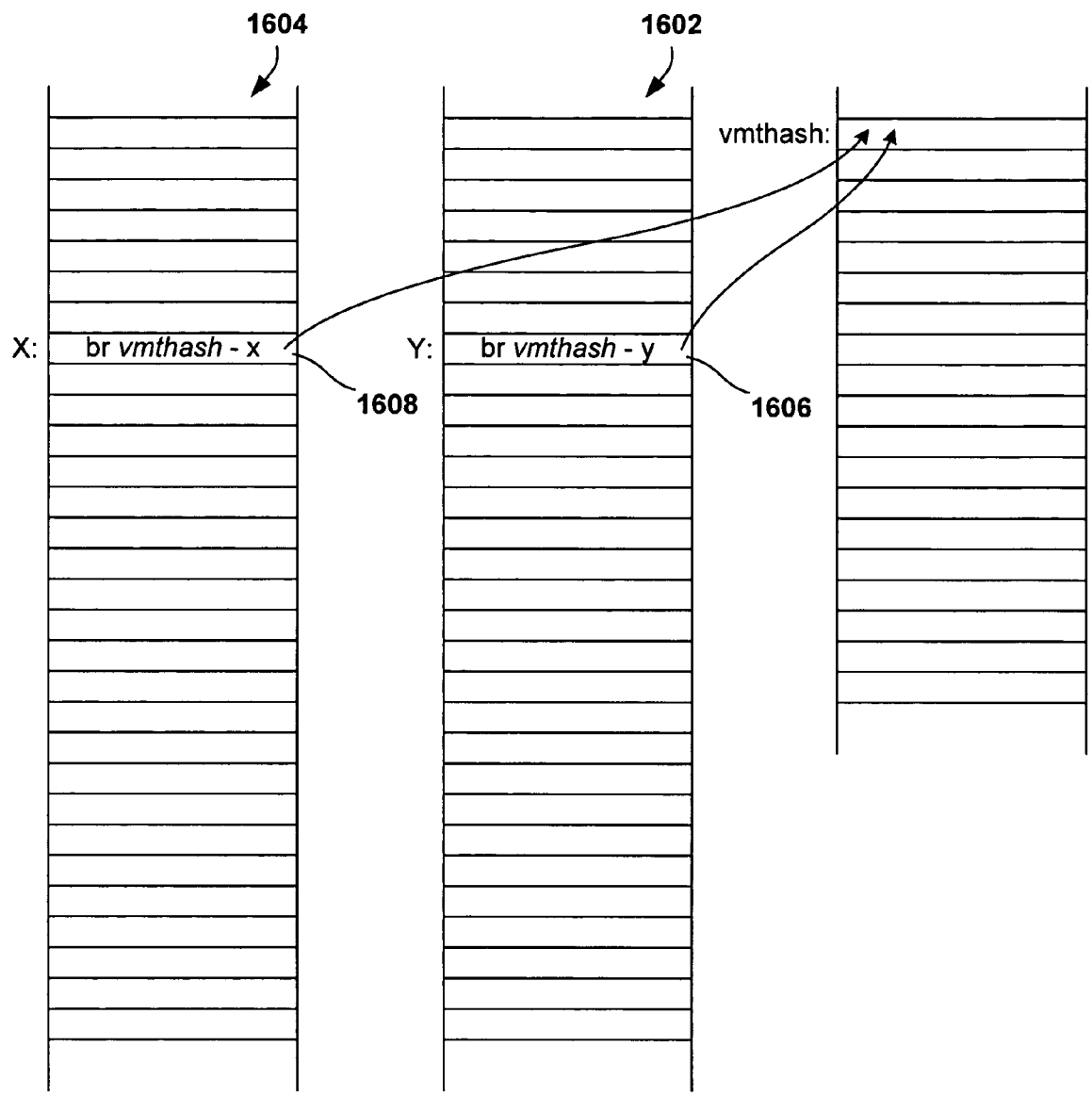
FIG. 16 illustrates a problem associated with virtual-address aliasing with respect to executable-code patching.

FIG. 16 illustrates a problem associated with virtual-address aliasing with respect to executable-code patching. In FIG. 16, the same physical page is aliased, logically appearing as two different virtual-memory pages 1602 and 1604. The physical page included a thash instruction that is overwritten, by the virtual-monitor, to contain a branch instruction to the virtual-monitor patch code vmthash. The branch instruction 1606 appears at address Y in the first virtual-memory page 1602, and appears at address X 1608 in the second virtual-memory page 1604. The immediate operand for an IP relative branch instruction contains the offset from the virtual address of the branch instruction to the virtual address of the target of the branch instruction. Thus, the immediate operand for the branch instruction 1606 on the first virtual-memory page 1602 needs to contain the offset vmpatch-Y, while the immediate operand of the branch instruction 1608 on the second virtual-memory page 1604 needs to contain the offset vmpatch-X, as shown in FIG. 16. However, both the first virtual-memory page 1602 and the second virtual-memory page 1604 correspond to the same, identical physical memory page into virtual-address aliasing. The physical page can contain only a single instruction with a single immediate-operand containing a single offset. If the offset on the physical page is vmthash-Y, then the branch instruction transfer to the virtual address X will branch to some location other than vmthash. Conversely, if the immediate operand of the branch instruction contains the offset vmthash-X, then the branch instruction transfers control to some memory location other than vmthash. Therefore, a naive approach to patching guest-operating-system executable code to emulate instructions in an architecture that supports virtual-address aliasing is likely to fail disastrously.

An approach to handling the problem illustrated in FIG. 16 that represents one embodiment of the present invention is next provided. FIG. 17 shows two tables that facilitate an approach to patching virtual-address-aliased memory pages according to one embodiment of the present invention. The first table 1702 is a patched page table "PPT," and the second table 1704 is a virtual-address-alias table "VAAT." Many different forms of the PPT and VAAT can be conceived, implemented, and used in various different embodiments of the methods of the present invention. Alternative forms of these tables may contain different encodings of the information contained in the exemplary tables, or may contain different information to facilitate different techniques for implementing the methods of the present invention.

In the embodiment discussed below, the PPT includes entries for each patched, physical page. The entries are represented in FIG. 17 as rows. Each entry includes a physical page address, such as the physical page address 1706 in entry 1708 of a portion of the PPT displayed in FIG. 17. Each entry also includes a pointer field (1710 for entry 1708) that is used to chain together certain groups of entries corresponding to patched physical pages. The VAAT 1704 has a similar format, each entry, such as entry 1712, including a pointer field (1714 in entry 1712) used to chain together certain groups of entries, and a virtual-address field (1716 for entry 1712) that contains a virtual-address. In subsequent figures, the virtual-address field of VAAT entries is shown to include both additional translation information, such as the physical address to which the virtual address is mapped and an indication that the page is protection-key-domain protected against data access. This additional translation information is shown in order to avoid unnecessary complexity in the figures. Entries chained together through the pointer field into a group of entries represent virtual addresses that alias one another.

Figure 18:
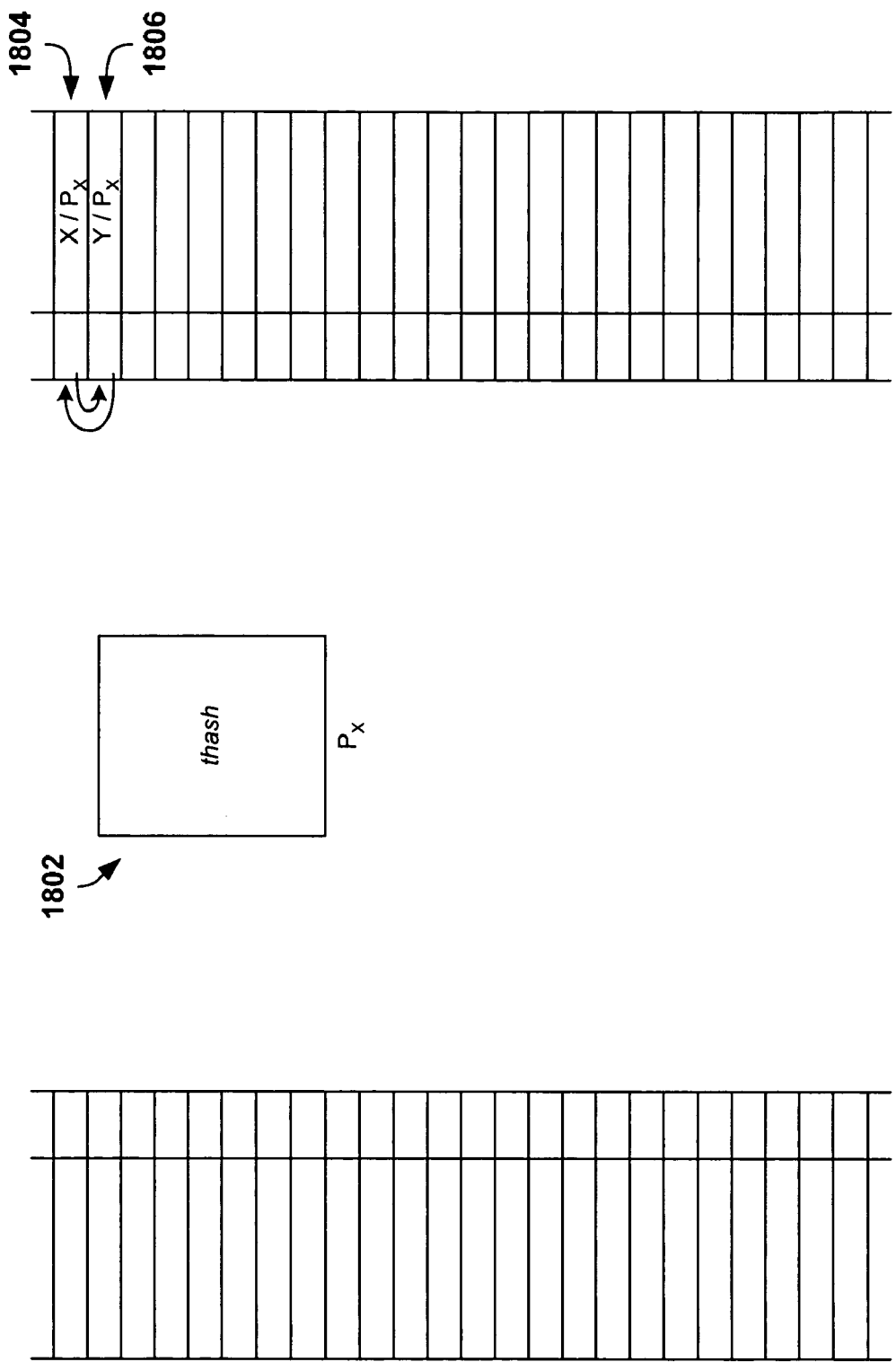
FIGS. 18–21 illustrate use of the patched page table and virtual-address-alias table by a virtual-machine monitor to handle patched, virtual-address-aliased memory pages in one embodiment of the present invention.

FIGS. 18–22 illustrate use of the patched page table and virtual-address-alias table by a virtual-machine monitor to handle patched, virtual-address-aliased memory pages. In FIG. 18, a single physical memory page 1802 with physical-memory address $P_x$ has been aliased, mapped through the virtual-address translation mechanism back to two different virtual-page addresses X and Y. To represent this virtual aliasing, the VAAT includes two entries 1804 and 1806, chained together by the pointer fields, representing the two virtual-page addresses X and Y, both mapped to physical-memory page $P_x$. Thus, FIG. 18 shows a case where virtual aliasing has occurred prior patching of physical-memory $P_x$ by a virtual-machine monitor.

Figure 19:
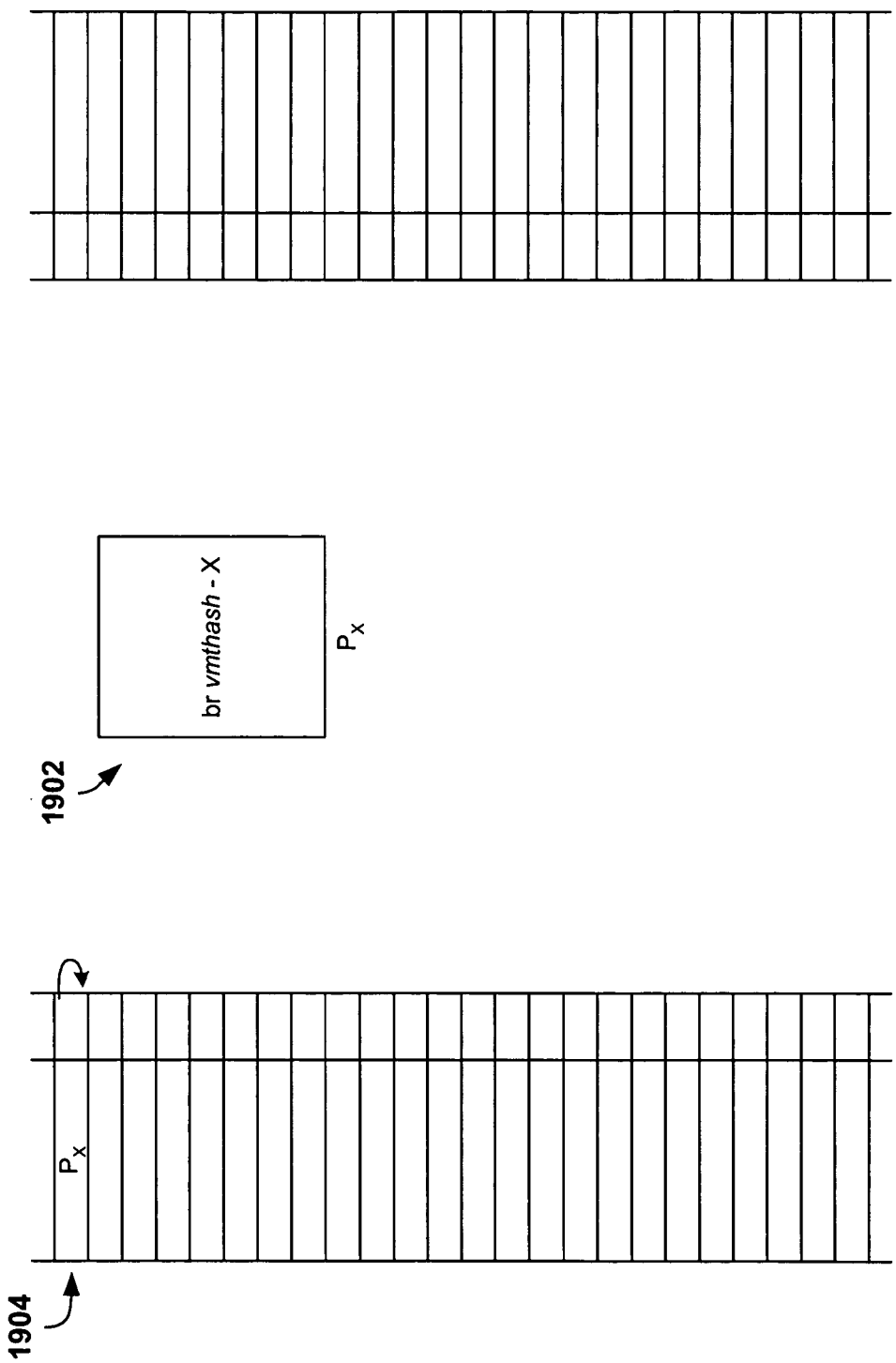

FIG. 19 illustrates a different scenario with respect to physical-memory page $P_x$. In the scenario illustrated in FIG. 19, the physical-memory page $P_x$ 1902 is not virtual-address aliased, shown in FIG. 19 by the absence of entries for physical-memory page $P_x$ in the VAAT, but has been patched by a virtual-machine monitor to replace a thash instruction with a branch instruction to a virtual-monitor emulation code block vmthash. As shown in FIG. 19, the branch instruction has an immediate-operand containing the offset vmthash-X, the offset needed for IP-relative transfer of control, as discussed above. In this case, the virtual-machine monitor has made an entry 1904 into the PPT to indicate that physical-memory page $P_x$ has been patched. The entry is a group by itself, indicated in FIG. 19 by the pointer field referencing the entry 1904 containing the pointer field.

Figure 20:
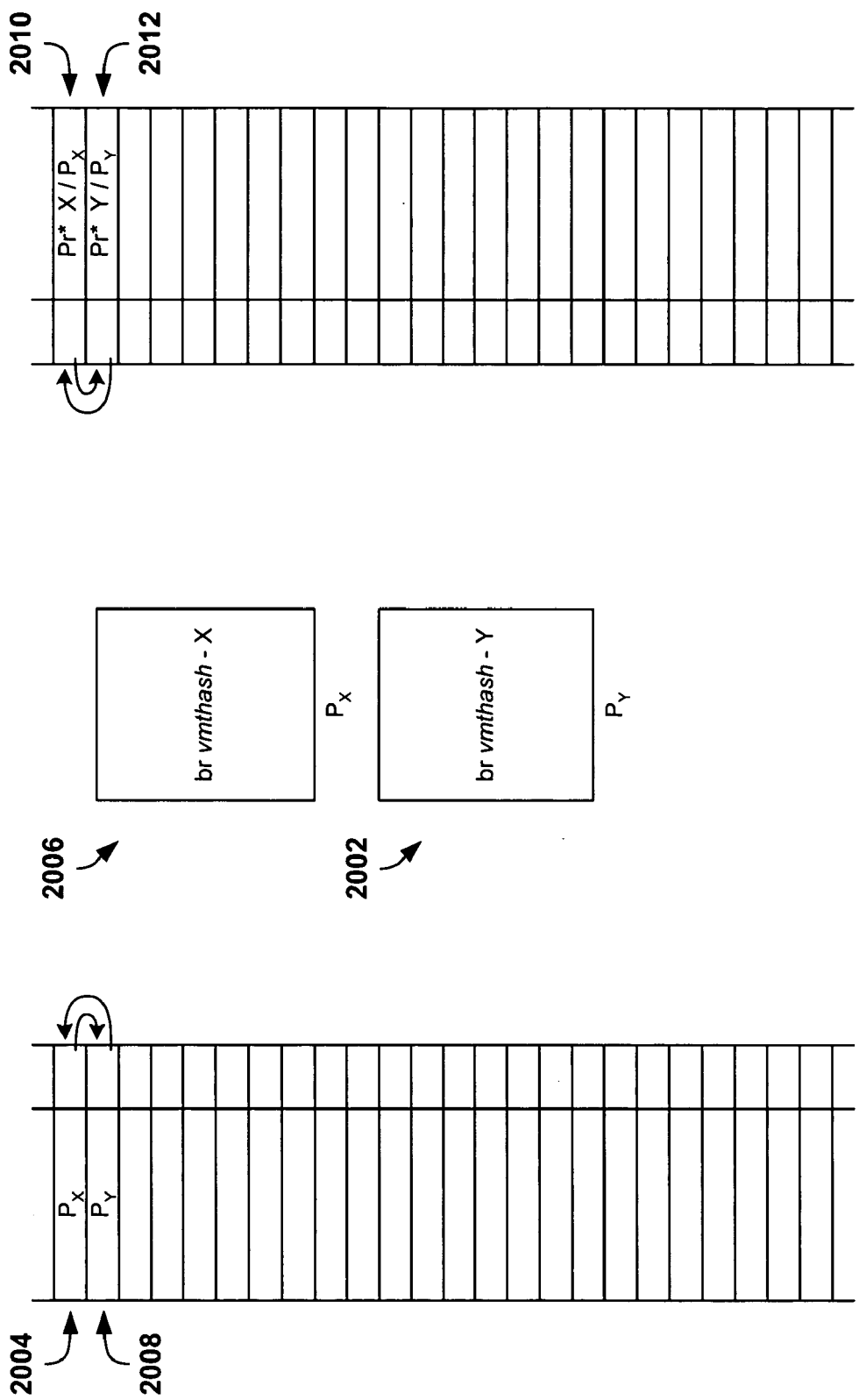

FIG. 20 illustrates the contents of the attached page table in the virtual-address-alias table following a page-patch event, in the case illustrated in FIG. 19, or a virtual-address-aliasing event, in the case illustrated in FIG. 19. In other words, if the virtual-address-aliased physical-memory page $P_x$, in the case shown in 19, is subsequently patched by the virtual-machine monitor, the PPT, VAAT, and memory states illustrated in FIG. 20 will obtain. Similarly, if the physical-memory page $P_x$ in the case shown in FIG. 19 is subsequently aliased, then the PPT, VAAT, and memory state shown in FIG. 20 will also obtain. In FIG. 20, the patched contents of physical-memory page $P_x$ 1902 has been copied into a second physical-memory page $P_y$ 2002. In other words, the virtual-address-aliased patched physical-memory page $P_x$ 1902 has been physically aliased to produce a physical-memory page copy $P_y$ 2002. There are now two entries 2004 and 2008 in the PPT, chained together through pointer fields, indicating that physical-memory pages $P_x$ and $P_y$ are both patched, and are physical aliases of a single physical-memory page. The two entries 2010 and 2012 in the VAAT indicate that virtual-address X and virtual-address Y are aliases for a single physical-memory page, although virtual-address X is translated to physical-memory page $P_x$, while virtual-page address Y is translated to physical-page address $P_y$. In addition, the entries 2010 and 2012 include the symbol "Pr*" to indicate that the translations for these two virtual addresses include a protection key that provides execute-only permission. If a guest operating system were to attempt a data access (load or store) to either virtual-page X or virtual-page Y, a key permission fault would occur that would be handled by the virtual-machine monitor to allow the virtual-machine monitor to emulate data access to the virtual-memory page, as described below.

Thus, in order to handle patching of virtual-address-aliased physical-memory pages, the virtual-machine monitor physically aliases the page, so that the virtual-machine monitor may place a branch instruction with a correct virtual-address offset to allow for IP-relative branching from the physical pages to the virtual-monitor patch code. Note, in FIG. 20, that the branch instruction replacing the thash instruction in physical-memory page $P_x$ 1902 includes the offset vmthash-X, while the branch instruction in the physical-memory page $P_y$ 2002 includes the offset vmthash-Y. Following physical aliasing, the branch instruction on each of the physically-aliased memory pages correctly transfers control to the virtual-monitor patch code vmthash.

Figure 21:
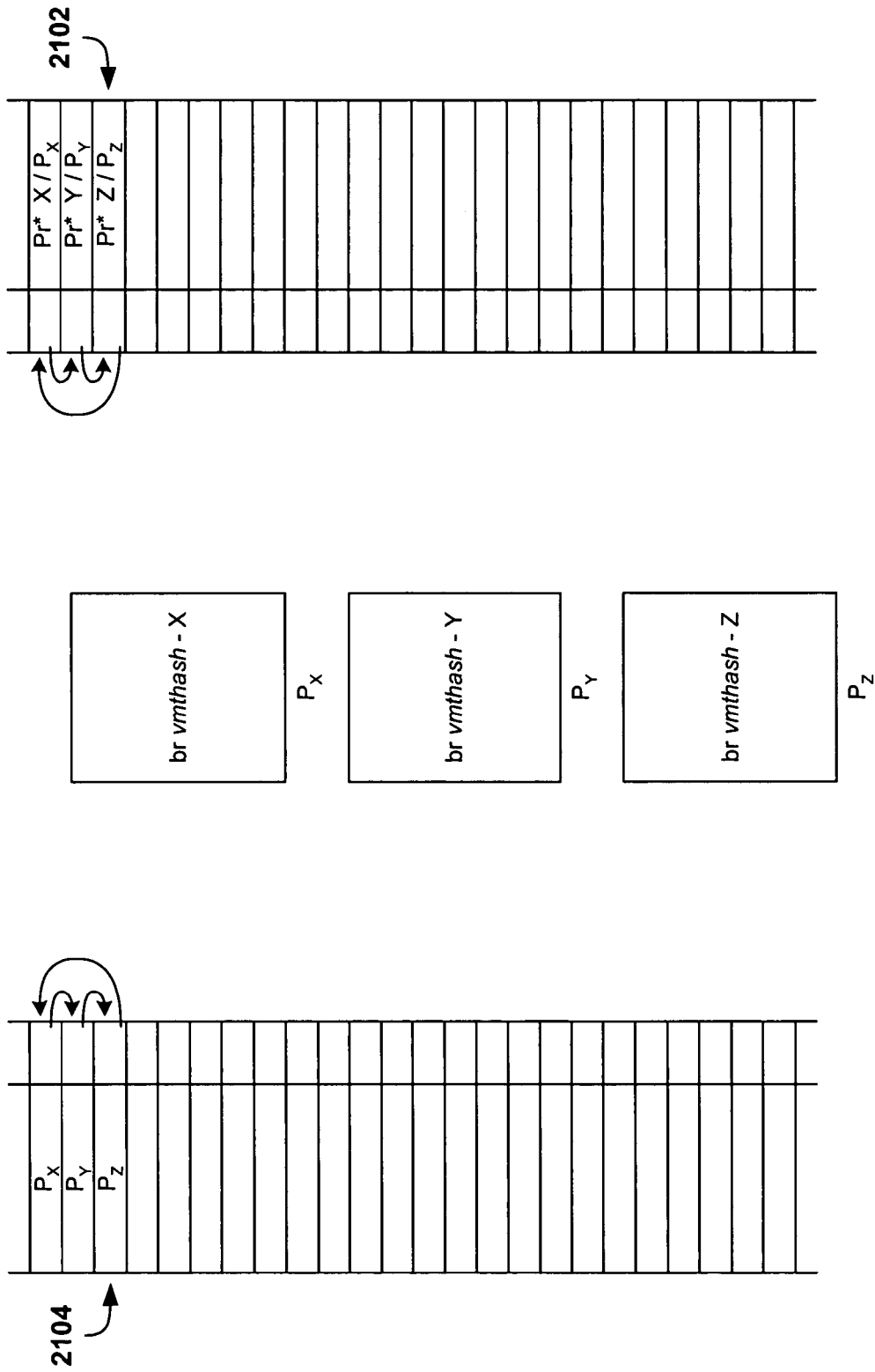

FIG. 21 illustrates the states of the attached page table, virtual-address-alias table, and memory following an additional virtual-address aliasing of the physical memory page $P_x$. As shown in FIG. 21, the virtual-machine monitor has added an additional entry 2102 into the VAAT for a third virtual-address alias constructed by a guest operating system. Now, all three virtual-address aliases are linked together through the pointer fields to form a group of three virtual-address aliases for physical-memory page $P_x$. However, the virtual-machine monitor has physically aliased physical-memory page $P_x$ twice to produce physical-memory page $P_y$ and physical-memory page $P_z$, both containing the original contents of physical-memory page $P_x$ with the exception that virtual-monitor-introduced patches are specific to each physical alias page so that IP-relative transfer of control by branch instructions from each of the physical-memory-page aliases correctly transfers control to the virtual-monitor code patch vmthash. Note that the virtual-machine monitor has added an additional entry 2104 into the PPT, and linked it together with the previously entered entries for physical-page $P_x$ and physical-page $P_y$ to indicate that all three physical-pages $P_x$, $P_y$, and $P_z$ represent physical aliases of the same, original physical-memory page.

FIG. 22 illustrates how the virtual-machine monitor handles a key permission fault generated by an attempt by a guest operating system to access a virtually aliased virtual-memory page. As discussed above, the translation for a patched, virtual-address-aliased virtual-memory page includes a protection key that matches a protection-key register with both read-disable and write-disable bits set. In other words, the virtual-machine monitor uses the protection-key mechanism to prevent a guest operating system from accessing a patched, virtual-address-aliased virtual-memory page as data. In the case that the guest operating system attempts to the read the contents of a word within a patched, virtual-address-aliased virtual-memory page, as shown in FIG. 22, the virtual-machine monitor directs the guest-operating-system read access to a word containing the restored contents as it existed prior to patching by the virtual-machine monitor. The virtual-machine monitor can accomplish this re-direction of the read access either by temporarily unpatching the physical-memory page to which the accessed virtual address maps, or by emulating the read-access operation to return the restored value. However, the virtual-machine monitor does not permanently unpatch the physical-memory page to which the accessed virtual address maps. The physical-memory page is not unpatched, because the virtual-machine monitor cannot know whether the guest operating system may execute the virtual-memory page in the future. Note that, by trapping read access to patched pages, and emulating the read access to return results that would be returned by access to the original, unpatched page, the virtual-machine monitor prevents guest operating systems from discovering that they are executing on a virtual-machine interface provided by the virtual-machine monitor, rather than directly on a hardware interface.

FIGS. 23–24 illustrate how the virtual-machine monitor handles an attempt by a guest operating system to access a patched, virtual-address-aliased virtual-memory page for a write operation. In FIG. 23, the write access is directed by a guest operating system to virtual-memory page X. In response to the write access, the guest operating system de-allocates the physical aliases for physical-memory page $P_x$, physical-memory pages $P_y$ and $P_z$ in the examples illustrated in FIGS. 18–21, and removes the entries for physical-memory pages $P_x$, $P_y$, and $P_z$, from the PPT. Furthermore, the virtual-machine monitor updates translations for the virtual-memory pages X, Y, and Z so that all three virtual-memory addresses X, Y, and Z again map to physical-memory page $P_x$. The original contents of physical-memory page $P_x$ are restored, unpatching physical-memory page $P_x$. Updating the translations for virtual-memory addresses X, Y, and Z also involves removing the protection keys associated with the execution-only protection-key domain. In other words, a write access attempted by a guest operating system to a patched, virtual-address-aliased physical-memory page results in all physical aliases for the page being removed, and the original contents of the physical-memory page restored by removal of patches introduced by the virtual-machine monitor. In alternative embodiments, the write operation is emulated and applied to all physical alias pages. FIG. 24 shows the states of the PPT, VAAT, and memory relative to virtual-memory-page addresses X, Y, and Z and physical-memory page $P_x$. The virtual-machine monitor removes physical aliasing and restores the original content of the physical-memory page because, once a guest operating system writes a value to a virtual-memory page, the virtual-machine monitor can assume that the page is a data page, rather than an executable page. In other words, the virtual-machine monitor assumes that guest operating systems do not include both executable code and data within a single virtual-memory page. In the extremely rare cases where this assumption is violated, the virtual-machine monitor can continue to use physical aliasing, despite guest-operating-system write access to a virtual-address-aliased virtual-memory page.

Figure 25:
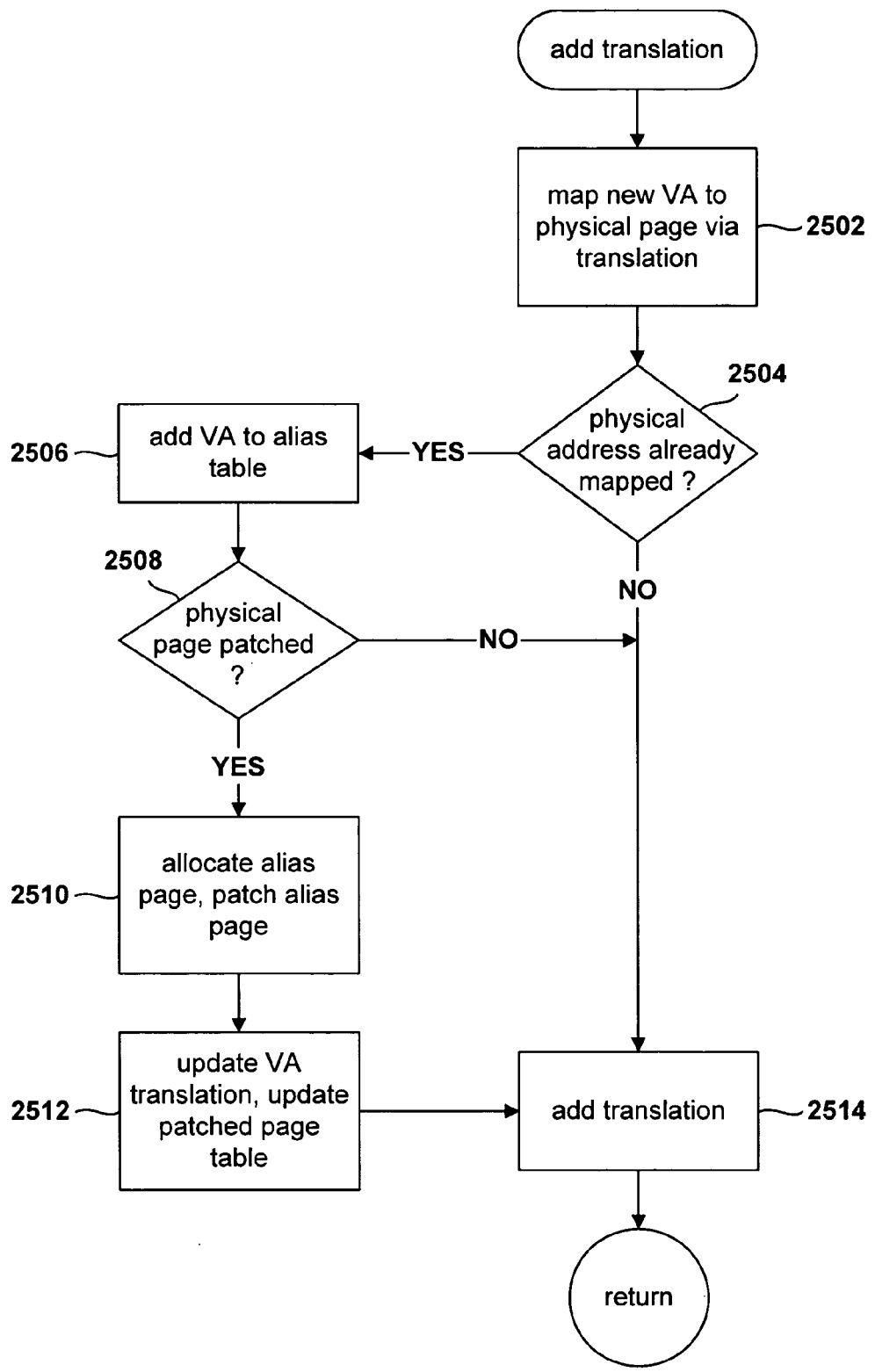
FIGS. 25–27 illustrate, using control-flow diagrams, the above-described embodiment of methods of the present invention.
Figure 26:
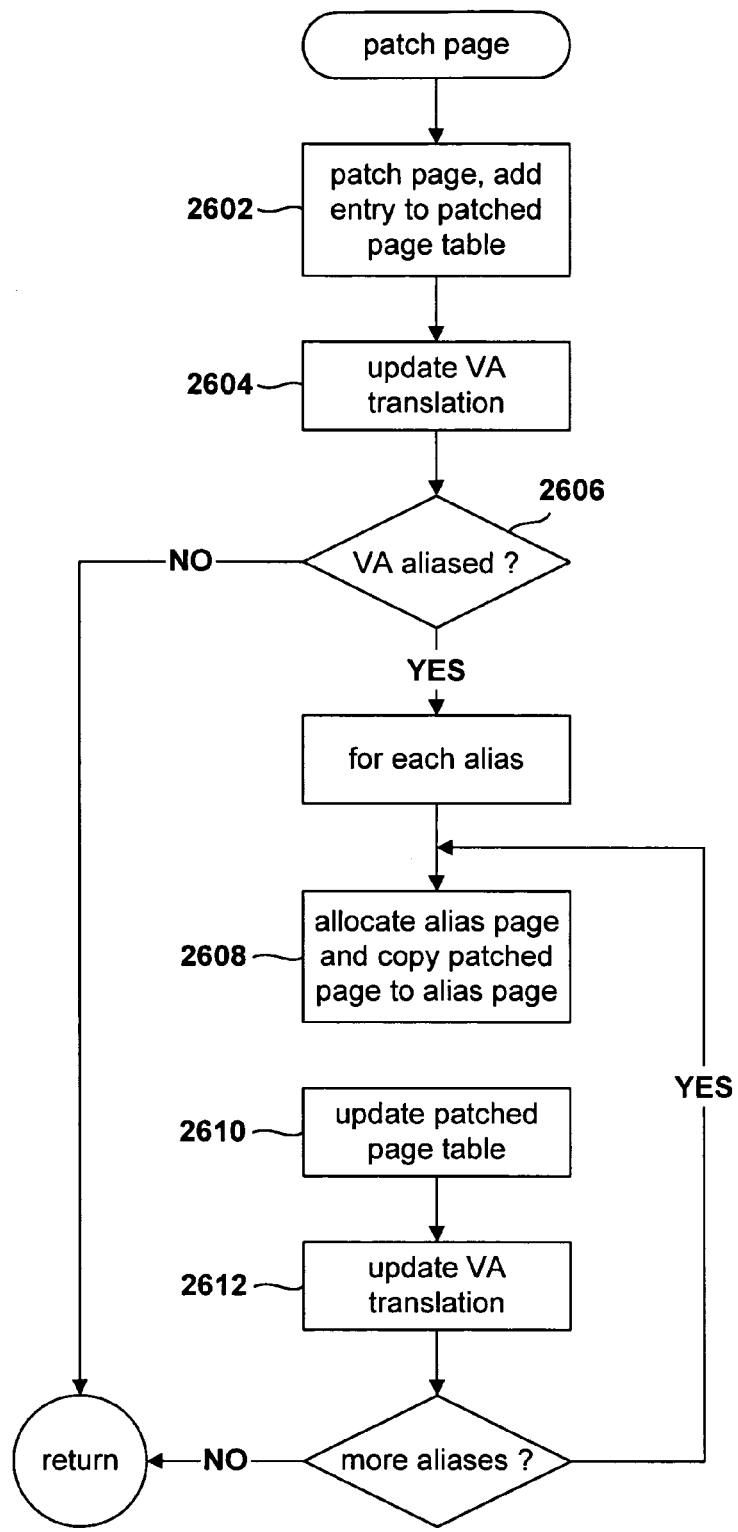
Figure 27:
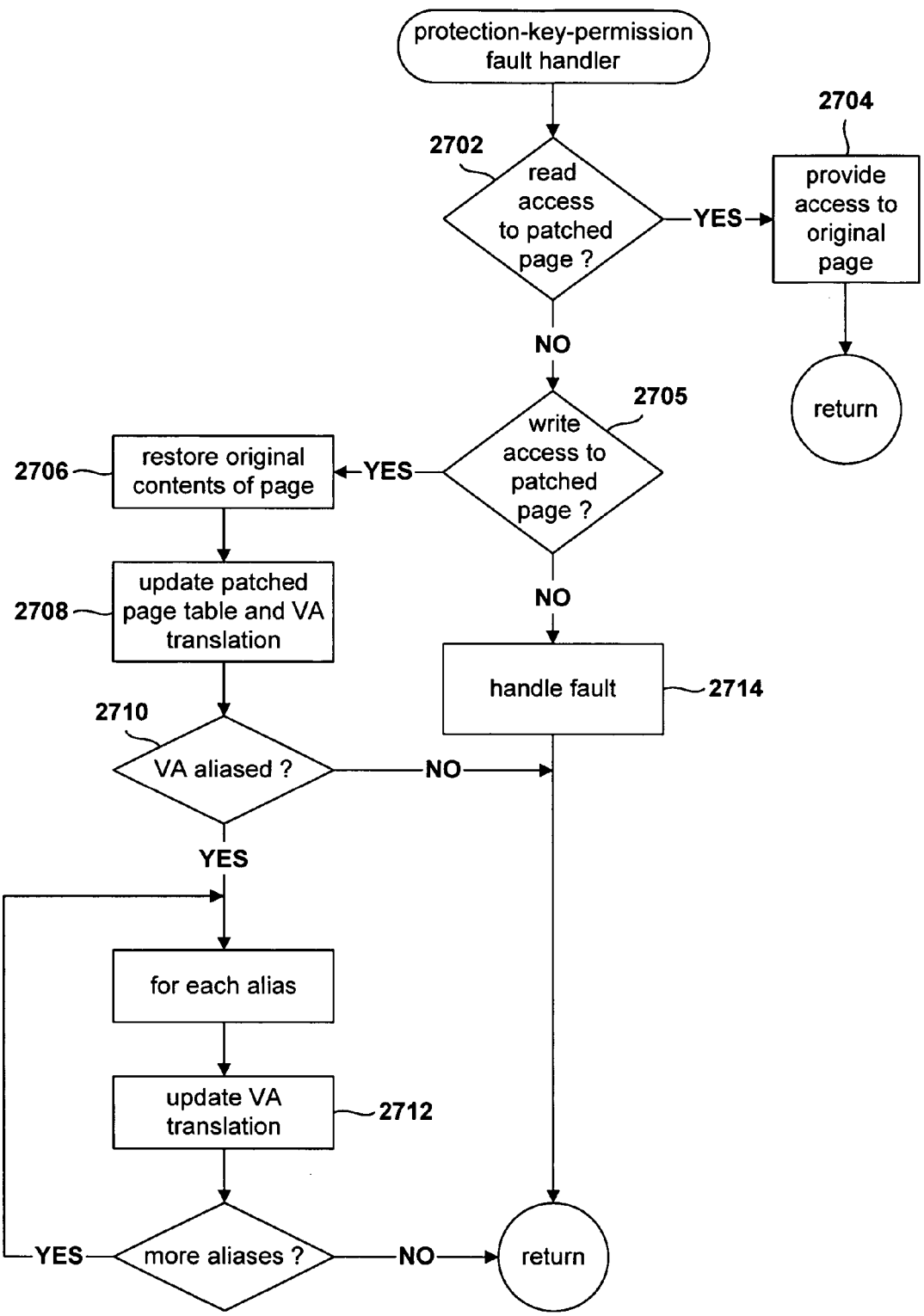

FIGS. 25–27 illustrate, using control-flow diagrams, the above-described embodiment of methods of the present invention. FIG. 25 illustrates addition to the logic normally undertaken by a virtual-machine monitor to add a virtual-address translation on behalf of a guest operating system. In step 2502, the virtual-machine monitor creates an initial translation for the virtual address. If, as determined by the virtual-machine monitor in step 2504, a different virtual address already maps to the physical address, then, in step 2506, the virtual-machine monitor updates the VAAT to add the new virtual address to already existing aliases for the physical-page address or, in the case that the new virtual address is the first alias for the physical page, enters both the new virtual address and the already existing virtual address after the physical page to the VAAT. Then, the virtual-machine monitor determines whether the physical page to which the virtual address maps, in step 1608, is patched. If so, then, in step 2510, the virtual-machine monitor allocates a physical alias, physical-memory page, copies the contents of the original physical page to the physical-alias physical page, updates the patches on the newly allocated physical-alias page so that IP-relative branching correctly transfers control to virtual-monitor code patches, and then, in step 2512, updates the newly created translation for the virtual address to include a protection key corresponding to a protection-key domain affording only execution access to the page and updating the mapping so that the virtual address maps to the physical alias created in step 2510, updating the PPT to include a new entry for the physical alias created in step 2510. If the physical address to which the new virtual address maps has not previously been allocated or mapped by another virtual address, as determined in step 2504, or the physical page to which the new virtual address maps is not patched, as determined in step 2508, then the original translation created in step 2502 is added to the TLB and VHPT in step 2514.

FIG. 26 is a control-flow diagram illustrating logic additions to virtual-monitor page patching to support methods of the present invention. When a virtual-machine monitor decides to patch a page, in order to emulate instructions, as discussed above, the virtual-machine monitor, in step 2602, patches those instructions that the virtual-machine monitor wishes to emulate in the physical-memory page and adds an entry to the PPT. Next, in step 2604, the virtual-machine monitor updates the virtual address translation for the virtual address that is mapped to the physical page. In step 2606, the virtual-machine monitor determines whether the virtual address for the physical page patched in step 2602 is aliased. If not, then the virtual-machine monitor has finished the page patching. Otherwise, for each virtual-address alias for the physical page, the virtual-machine monitor allocates a physical alias page, copies the original contents of the patched page to the physical alias page in Step 2608, updates the PPT in step 2610, and updates the virtual address translation for the alias in step 2612, including adding the protection key associated with the execution-only protection-key domain and updating the physical page to which the virtual address maps to the physical alias page allocated in step 2608.

FIG. 27 is a control-flow diagram illustrating logic additions to the protection-key-permission fault handler of a virtual-machine monitor that handles virtual-address-aliased, patched pages according to one of many embodiments of the present invention. In step 2702, a protection-key-permission fault handler of the virtual-machine monitor is invoked as a result of an executing program attempting to access a virtual-memory page, the translation for which includes a protection key for a protection-key domain that does not provide data access to the virtual-memory page. If, in step 2702, the fault handler determines that the previously executed program attempted a read access to a patched page, then the fault handler provides access to the original, unpatched contents of the page, in step 2704, as previously described with reference to FIG. 22. If, on the other hand, the fault handler determines that the protection-key-permission fault was generated by the previously executing program attempting write access to a patched page, as detected in step 2704, then the fault handler restores the original contents of the patched page in step 2706, updates the PPT to remove all entries in the PPT for the accessed page and all physical aliases of the accessed page, in step 2708, and updates the virtual address translation for the physical page through which the previously executing program attempted write access to the physical page. If, as determined in step 2710, the virtual address through which the previously executing program attempted write access to the physical page is aliased, then for each alias, the fault handler, in step 2712, updates the virtual-address translation for the alias to map the virtual address to the original physical-memory page and removes the protection key associated with the protection-key-domain for patched memory pages. If the protection-key-information fault was not generated by read or write access to a patched page, then the protection-key-permission fault is handled in a normal fashion by the fault handler in step 2714.

Although the present invention has been described in terms of a particular embodiment, it is not intended that the invention be limited to this embodiment. Modifications within the spirit of the invention will be apparent to those skilled in the art. For example, as discussed above, many different types of PPT and VAAT tables can be conceived and implemented to facilitate handling of virtual-addressed-aliased, patched virtual-memory pages by virtual-machine monitors. In the embodiment described above, the PPT and VAAT included pointer fields for linking entries into multi-entry groups to reflect physical aliasing, in the case of the PPT, and virtual-address aliasing, in the case of the VAAT. However, more efficient techniques are possible. For example, when the PPT and VAAT are known to be small, ordering the entries and co-locating entries corresponding to physical aliases and virtual-address aliases, with additional fields to flag the end of co-located groups, may more efficiently represent the states of physical aliasing, virtual-address aliasing, and physical memory. An almost limitless number of different implementations of the logic needed by a virtual-machine monitor to physically alias physical-memory pages that are patched and virtual-addressed aliased are possible, including different control structures, modularization, implementation in different languages, different data structures, and intercepting guest-operating-system-generated events at different points or in different ways.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for patching and aliasing a virtual-memory page by a virtual-machine monitor, the method comprising:

when the virtual-memory page is aliased and needs to be patched, physically aliasing each alias of the virtual-memory page and separately patching each physical alias;

when the virtual-memory page is patched and needs to be aliased, aliasing the virtual-memory page by creating a virtual-address alias, physically aliasing the created alias of the virtual-memory page, and separately patching each physical alias; and detecting access to patched, aliased pages and resolving the access.

2. The method of claim 1 wherein physically aliasing a virtual-address alias further includes:

allocating a new physical memory page corresponding to the virtual-address alias;

modifying a virtual-address translation for the virtual-address alias to reference the allocated physical-memory page; and copying contents of a physical memory page associated with an original virtual-memory address equivalent to the virtual-address alias to the allocated physical memory page.

3. The method of claim 2 wherein physically aliasing a virtual-address alias further includes storing an association between the allocated physical page and the physical memory page.

4. The method of claim 1 wherein aliasing a virtual-memory page by creating a virtual-address alias further includes:

allocating a new virtual-memory address;

allocating a translation for the new virtual-memory alias;

storing a reference to a physical-memory page corresponding to the virtual-memory page in the newly created translation; and storing an association between the new virtual-memory address and an original virtual-address for the virtual-memory page.

5. The method of claim 1 wherein resolving access to an aliased virtual-memory page further includes:

when the access is a read operation directed to the aliased virtual-memory page, directing the read operation to a page containing unpatched, original contents of the original virtual-memory page.

6. The method of claim 1 wherein resolving access to an aliased virtual-memory page further includes:

when the access is a write operation directed to the aliased virtual-memory page, directing the read operation to a page containing unpatched, original contents of the original virtual-memory page and updating virtual-address translations for all of the virtual-address aliases of the virtual-memory page to the page containing unpatched, original contents of the original virtual-memory page.

7. Computer-readable instructions encoded in a computer-readable medium that implement the method of claim 1.

8. A virtual-machine monitor that includes instructions that implement the method of claim 1.

* * * * *